US012786345B2

(12) United States Patent
McCoy

(10) Patent No.: US 12,786,345 B2
(45) Date of Patent: Nov. 3, 2026

(54) SYSTEMS AND METHODS FOR COMMUNICATING AUDIO DATA

(71) Applicant: Sony Interactive Entertainment LLC, San Mateo, CA (US)

(72) Inventor: Charles McCoy, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 254 days.

(21) Appl. No.: 17/864,222

(22) Filed: Jul. 13, 2022

(65) Prior Publication Data

US 2024/0022682 A1 Jan. 18, 2024

(51) Int. Cl.

| | |
|---|---|
| ***H04N 5/278*** | (2006.01) |
| ***G10L 15/22*** | (2006.01) |
| ***G10L 15/26*** | (2006.01) |
| ***G10L 21/10*** | (2013.01) |
| ***G10L 25/57*** | (2013.01) |

(Continued)

(52) U.S. Cl.

CPC ............. *H04N 5/278* (2013.01); *G10L 25/57* (2013.01); *G10L 25/63* (2013.01); *G10L 15/22* (2013.01); *G10L 15/26* (2013.01); *G10L 21/10* (2013.01); *H04N 21/233* (2013.01); *H04N 21/4312* (2013.01); *H04N 21/4884* (2013.01); *H04N 21/81* (2013.01)

(58) Field of Classification Search

CPC .. H04N 21/4884; H04N 5/278; H04N 21/233; H04N 5/27; H04N 21/81; H04N 21/4312; G10L 25/57; G10L 25/63; G10L 21/10; G10L 15/26; G10L 15/22

See application file for complete search history.

(56) References Cited

U.S. PATENT DOCUMENTS

| | | | | |
|---|---|---|---|---|
| 8,841,535 B2 | 9/2014 | Collins | | |
| 9,013,631 B2 * | 4/2015 | Suvorov | ............ | H04N 21/4318 348/495 |

(Continued)

FOREIGN PATENT DOCUMENTS

| | | | | |
|---|---|---|---|---|
| JP | 2002315966 A | * 10/2002 | | |
| KR | 20110025720 A | * 3/2011 | ............. | H04W 4/60 |

(Continued)

OTHER PUBLICATIONS

Vermun et al, Gesture Based Affective and cognitive States Recognition Using Kinect for effective feedback during a-Learning, IEEE (Year: 2013).*

(Continued)

*Primary Examiner* — Carolyn R Edwards
*Assistant Examiner* — Kuassi A Ganmavo
(74) *Attorney, Agent, or Firm* — Kilpatrick Townsend & Stockton LLP

(57) ABSTRACT

Systems and methods for communicating audio data are described. One of the methods includes accessing at least one identifier of at least one source of at least one of the plurality of sounds, and accessing at least one identifier of at least one emotion conveyed by the at least one of the plurality of sounds. The method further includes sending the at least one identifier of the at least one source and the at least one identifier of the at least one emotion to display the at least one identifier of the at least one source and the at least one identifier of the at least one emotion with an output of a scene.

22 Claims, 8 Drawing Sheets

(Standard Punctuation)

(51) Int. Cl.

| | |
|---|---|
| ***G10L 25/63*** | (2013.01) |
| ***H04N 21/233*** | (2011.01) |
| ***H04N 21/431*** | (2011.01) |
| ***H04N 21/488*** | (2011.01) |
| ***H04N 21/81*** | (2011.01) |

(56) References Cited

U.S. PATENT DOCUMENTS

| | | | | |
|---|---|---|---|---|
| 10,547,897 | B2 * | 1/2020 | Iwami | H04N 21/414 |
| 10,878,819 | B1 * | 12/2020 | Chavez | G10L 15/25 |
| 2004/0038739 | A1 * | 2/2004 | Wanat | A63F 13/58 463/36 |
| 2005/0038661 | A1 | 2/2005 | Momosaki et al. | |
| 2006/0015560 | A1 * | 1/2006 | MacAuley | A63F 13/12 709/206 |
| 2008/0025698 | A1 * | 1/2008 | Momosaki | H04N 21/4325 348/E5.122 |
| 2009/0148135 | A1 | 6/2009 | Ishino et al. | |
| 2009/0177976 | A1 * | 7/2009 | Bokor | G06F 3/011 715/753 |
| 2010/0097523 | A1 * | 4/2010 | Shin | H04N 21/4884 348/468 |
| 2010/0121808 | A1 * | 5/2010 | Kuhn | G06N 20/00 463/43 |
| 2010/0302401 | A1 * | 12/2010 | Oku | H04N 9/8211 348/222.1 |
| 2011/0283865 | A1 * | 11/2011 | Collins | G06F 3/16 84/464 R |
| 2012/0054646 | A1 * | 3/2012 | Hoomani | H04L 51/04 715/758 |
| 2013/0274015 | A1 * | 10/2013 | Bill | A63F 13/825 463/31 |
| 2014/0004948 | A1 * | 1/2014 | Watkins, Jr. | A63F 13/655 463/36 |
| 2014/0111688 | A1 * | 4/2014 | Suvorov | H04N 21/43072 348/500 |
| 2014/0112556 | A1 * | 4/2014 | Kalinli-Akbacak | G06V 40/176 382/128 |
| 2017/0134821 | A1 * | 5/2017 | D'Amelio | H04N 21/42203 |
| 2017/0171614 | A1 * | 6/2017 | el Kaliouby | G16H 50/70 |
| 2017/0287481 | A1 * | 10/2017 | Bhat | G10L 25/57 |
| 2018/0184140 | A1 * | 6/2018 | Danker | H04N 21/4758 |
| 2021/0182500 | A1 * | 6/2021 | Bill | G06F 40/157 |
| 2021/0192193 | A1 * | 6/2021 | Shaburov | G06V 40/171 |
| 2022/0012500 | A1 * | 1/2022 | Han | G06V 40/20 |
| 2022/0132217 | A1 | 4/2022 | Aher et al. | |
| 2022/0342623 | A1 * | 10/2022 | Adachi | G06F 3/0488 |
| 2023/0201717 | A1 * | 6/2023 | Liang | G10L 17/26 463/31 |

FOREIGN PATENT DOCUMENTS

| | | | | | |
|---|---|---|---|---|---|
| KR | 20200027909 | A | * | 3/2020 | A63F 12/54 |
| WO | WO-2006022071 | A1 | * | 3/2006 | H04N 21/4348 |
| WO | WO-2020091431 | A1 | * | 5/2020 | G06K 9/00288 |

OTHER PUBLICATIONS

PCT/US2023/069834 Notification of Transmittal of the International Search Report and the Written Opinion of the International Searching Authority, or the Declaration, PCT/ISA/220, and the International Search Report, PCT/ISA/210, Sep. 20, 2023.

* cited by examiner

FIG. 1 (Source Indicator)

FIG. 2 (Facial Expressions to Show Emotions)

FIG. 3 (Standard Punctuation)

FIG. 4 (Sudden Noise Identifier)

FIG. 5 (Border)

(Overlay logic @ Computing Device)

(Overlay logic @ Server System)

SYSTEMS AND METHODS FOR COMMUNICATING AUDIO DATA

FIELD

The present disclosure relates to systems and methods for communicating audio data.

BACKGROUND

The world is moving towards media. Media is all around us and is consuming a greater percentage of our daily lives. For example, people watch Netflix™ shows, movies, play video games, etc., sometimes for hours each day. Also, as another example, people listen to audio, such as music or talk shows or finance shows. The pandemic has exacerbated an amount of time spent accessing the media.

Some information regarding the media is conveyed via sub-titles that are generated with the media. However, the information does not convey sufficient information to a user.

It is in this context that embodiments of the invention arise.

SUMMARY

Embodiments of the present disclosure provide systems and methods for communicating audio data.

In an embodiment, information is represented visually from audio-accompanying programming, such as a movie, a television (TV) show, a video game, or audio-only programming, to make the information available to people who cannot perceive the information from the audio. For example, some people cannot perceive the information due to hearing impairments, or the television having the sound off or set to a low volume. To illustrate, the television when placed in a noisy bar or in a home where people are sleeping has the low volume, and the low volume cannot be heard by humans.

In one embodiment, several different types of sounds contribute to the audio-accompanying programming. Sub-titles focus mostly on spoken words, with occasional indications, such as "music playing" or "dog barking", that identify that other sounds are present without giving much detail.

Examples of the sounds that contribute to the audio-accompanying programming include speech, music, ambient sounds, and Foley™ sounds. As an example, the speech includes sounds, such as spoken words, grunts, or barks, created by characters of the programming for communication. The spoken words can be translated into a different language to be understood by an intended audience. An example of the music is an accompanying musical soundtrack, which can be choreographed to an action taking place or is intended to set a mood or is intended to elicit a particular emotion in the audience. As an example, the ambient sounds include an ongoing sound corresponding to what an environment, such as a location, surrounding characters of the programming would sound like in the programming. Illustrations of the ongoing sound include sounds of a babbling brook, a machine running, birds chirping, wind flowing through leaves of trees, waves on a beach, crowd noise, or automobiles passing by. As an example, the Foley sounds include sounds corresponding to actions that take place in the programming, such as a sound of a door closing, a gunshot, a crate being smashed, or glass breaking. To illustrate, the Foley sounds can correspond to action that is not seen, such as a monster approaching from behind.

In an embodiment, some aspects of audio information, such as a mood or emotional character of the sound, or a direction in which a particular sound is coming from, are left out of the sub-titles.

In one embodiment, additional information corresponding to a source of sound can be conveyed through the icons that are used to indicate their presence. Such information includes things such as the direction to the source or sources and the distance to the source or sources. Direction can be indicated by having a directional pointer associated with each icon that points in the direction in which the sound is coming from. The volume of the sound, corresponding to the relative distance to the source, can be indicated with an indicator next to the icon as well, such as a patch that changes color, a slider, or thermometer-style bar to indicate the volume, and thus the relative distance can be indicated. Multiple icons can be used to represent multiple sound sources. Alternatively, multiple indicators can be associated with a single icon to indicate multiple sources. In some cases, surfaces that reflect or absorb sound may make a sound appear as if it is coming from a different direction than the direction in which the source is located. In such a case the indicator can indicate the direction in which it sounds like the sound is coming from to accurately portray the information that is included in the audio.

In one embodiment, a source indicator, such as a source identifier, is provided. The source indicator associates sub-title text with a source of an audio, such as a character that spoke the text or a machine that is generating a beeping sound indicated by the sub-title text. The source indicator can use one or more of text color, text font, text style, text size, text location on a screen or within a sub-title area, or use a label for the text, such as an icon, symbol, or name. The icon to label spoken text can be an image of a character's head to make it easy to associate the sub-title text with the character who spoke that line.

In an embodiment, auto generation of enhanced sub-title information is provided. While static programming, such as the movie or the TV show, can have static corresponding enhanced sub-title information that is hand crafted, dynamic content, such as a video game or playback of programming that does not have corresponding enhanced sub-title information, has the enhanced sub-title information created dynamically. For some content, such as the video game, meta-data used for the generation of the audio is available to be used in the generation of the enhanced sub-title information. In such a case, the meta-data is used to determine information that is intended to be communicated in the audio and the use of the meta-data can ensure that generated sub-titles of the enhanced sub-title information represent that same information. For some content, such as playback of the TV show, the movie, or recorded game play, there is no metadata available to use in generation of the enhanced sub-title information. In such a case the system will need to analyze the audio to determine what sounds are present in the audio and what information is being communicated through the audio. Artificial intelligence (AI) can be used to "reverse engineer" the audio to determine what sound elements it contains, what information, such as mood or emotion, are being communicated through the audio, and what a human listening to the audio would perceive.

In an embodiment, facial expressions to show emotions are described. A part of what is missing in traditional sub-titles is a mood that the audio is trying to set, emotions that the audio is trying to evoke, or an emotion with which a dialog is spoken. As humans are good at reading emotions from facial expressions, images of faces can be used to express moods and emotions. Different faces can be associated with different elements of the audio, such as one face for emotions of the music and another face for the mood of the ambient sounds. Different faces can look like different people, or can be located in different locations, such as having a dedicated position where a face will appear to indicate the mood of music that is playing. There can be a face dedicated to threats communicated through the audio, with expressions corresponding to emotions, such as "What was that?" when rustling in trees nearby in a scene of the audio-accompanying programming is heard, and "Run!" when an angry beast is heard charging towards a character. The faces used to communicate emotion can be static renderings that are displayed to correspond to particular emotions or can be animated to change dynamically as the audio changes. Also, icons for emotions can be included in sub-title text indicate the emotion with which each portion of text was spoken. This can be useful in cases where a speaker character of the audio-accompanying programming is not shown in the video content, the video content is not seen by the audience, or when the audience is too busy reading the sub-titles to pick up on the facial expressions of the speaker character. An icon having the face of the character that is speaking can also show a facial expression corresponding to the emotion with which the line is being spoken. This can be useful to quickly identify both which character is doing the speaking along with the emotion the line is spoken with, which can be especially useful if the character doing the speaking is not shown in the video content.

In an embodiment, punctuation is described. In some cases, punctuation or symbols can be used to indicate certain information about the audio, such as a direction and volume level of different sound sources or a mood or emotion of music. By using standard punctuation characters, an existing system capable of rendering American Standard Code for Information Interchange (ASCII) subtitles can represent information about volume and direction of sounds. Systems that support more characters, such as Unicode, can allow for a larger pallet of symbols to be used. For example, the punctuation "{^}" indicates a quiet sound coming from the direction the camera is facing, while the punctuation "{{{>}}}" indicates a loud sound coming from the right of where the camera is facing.

In one embodiment, static display locations are described. The sub-titles are a stream of text that scrolls by as more of the text is displayed. The sub-titles are not a good fit for display of audio information other than text. For example, the Foley sounds, the mood of the ambient sounds, or the emotions that the music is trying to evoke cannot be represented by the sub-titles. Sounds that are long lived, such as the music playing, can be represented in a location that is not scrolled with the sub-title text so that it is continually visible while the corresponding sound is continuously playing. For example, there can be a portion of a display reserved for showing text, symbols, or images used to convey information about ongoing sounds, such as the music or ambient background sounds.

In an embodiment, sudden noises are described. Some noises are sudden and meant to startle the audience, just as a character in the programming would be startled by those noises. The startling effect of the noise is lost when the noise is explained in sub-title text, such as "[Gunshot]". To preserve the startling effect of the noise, there can be a sudden and dramatic change in the display to correspond to the sudden and dramatic change in the audio and generate much of the same reaction. For example, the screen or a portion of the screen can flash when a sudden noise is heard. In addition to the sudden and dramatic change, more information can be provided to indicate what a source of the sudden noise is. For example, a particular portion of the display can be reserved for indicating a source of Foley noises that are included in the audio, and the indicator can be text, symbols, or images. As another example, in the video game, different colors can be flashed to correspond to different sources for the sudden noises.

In one embodiment, use of borders to provide information from the audio is described. The borders around a whole screen or portions of the screen, such as, a map, a health status display area, or an area used to display subtitles, can be used to display information that would otherwise be communicated through the audio. For example, a red border around a health display area indicates that a corresponding creature, such as a monster, is close to death and corresponds with moaning sounds or difficult breathing sounds from that creature. As another example, a green border around a health display area can correspond to the creature having healed with a spell and can correspond to a sound of the healing spell being cast.

In the embodiment, different border characteristics can convey different information. For example, each color, such as hue and brightness, in which a border or portion of a border is displayed conveys different information. As another example, a thick border can indicate an aspect of the audio, such as, something that is louder, more prominent, or more urgent. As yet another example, a pattern of a border, such as a plain border, can have a different meaning than one with art-deco edges, frayed edges, or lacy looking and full of holes. As still another example, a combination border can have multiple components. To illustrate, a border with polka-dots on it can convey one type of information with a background of the border while the polka-dots can convey information about a different aspect through things such as their color, size, shape, number, density, and what percentage of the border they occupy. As another example, different portions of a border can convey different information, such as a left portion of a border giving information about what is to the left of a character and a right portion of the border giving information about what is to the right of the character. As yet another example, multiple nested borders can give information about different aspects, such as an inner border giving information about a character and an outer border giving information about that character's companion. Borders around different portions of the display can give information about different aspects of the audio or give different types of information. As another example, a change in a border can indicate information about aspects of a game. To illustrate, the border can flash when a sudden noise such as a gunshot is heard. As another illustration, a shimmering border can slow down when a creature to which the border corresponds is dying. In the illustration, the shimmering border is generated based on audio of the creature's breathing slowing or getting more difficult.

In one embodiment, a method for communicating audio data is described. The method includes accessing at least one identifier of at least one source of at least one of the plurality of sounds, and accessing at least one identifier of at least one emotion conveyed by the at least one of the plurality of sounds. The method further includes sending the at least one identifier of the at least one source and the at least one identifier of the at least one emotion to display the at least one identifier of the at least one source and the at least one identifier of the at least one emotion with an output of a scene.

In an embodiment, a server for communicating audio data is described. The server includes a processor that accesses at least one identifier of at least one source of at least one of the plurality of sounds. The processor accesses at least one identifier of at least one emotion conveyed by the at least one of the plurality of sounds. The processor sends the at least one identifier of the at least one source and the at least one identifier of the at least one emotion to display the at least one identifier of the at least one source and the at least one identifier of the at least one emotion with an output of a scene. The server includes a memory device coupled to the processor.

In one embodiment, a client device for communicating audio data is described. The client device includes a processor that accesses at least one identifier of at least one source of at least one of the plurality of sounds. The processor accesses at least one identifier of at least one emotion conveyed by the at least one of the plurality of sounds. The processor provides the at least one identifier of the at least one source and the at least one identifier of the at least one emotion to display the at least one identifier of the at least one source and the at least one identifier of the at least one emotion with an output of a scene. The client device includes a memory device coupled to the processor.

Some advantages of the herein described systems and methods include providing a display for hearing-impaired people to allow the hearing-impaired people to understand a scene, such as an audio only scene of the audio-accompanying programming or a video scene of the audio-accompanying programming. The hearing-impaired people cannot hear sounds output with the scene. The systems and methods described herein generate various types of indicators based on a meaning of the sound and display the indicators on a display screen of a display device. This allows the hearing-impaired people to understand or perceive the scene. Additional advantages of the herein described systems and methods include providing the indicators in other situations in which it is not convenient to have a normal sound volume, such as in a bar or when silence is to be maintained in a real-world environment.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for communicating audio data are described. It should be noted that various embodiments of the present disclosure are practiced without some or all of these specific details. In other instances, well known process operations have not been described in detail in order not to unnecessarily obscure various embodiments of the present disclosure.

Figure 1:
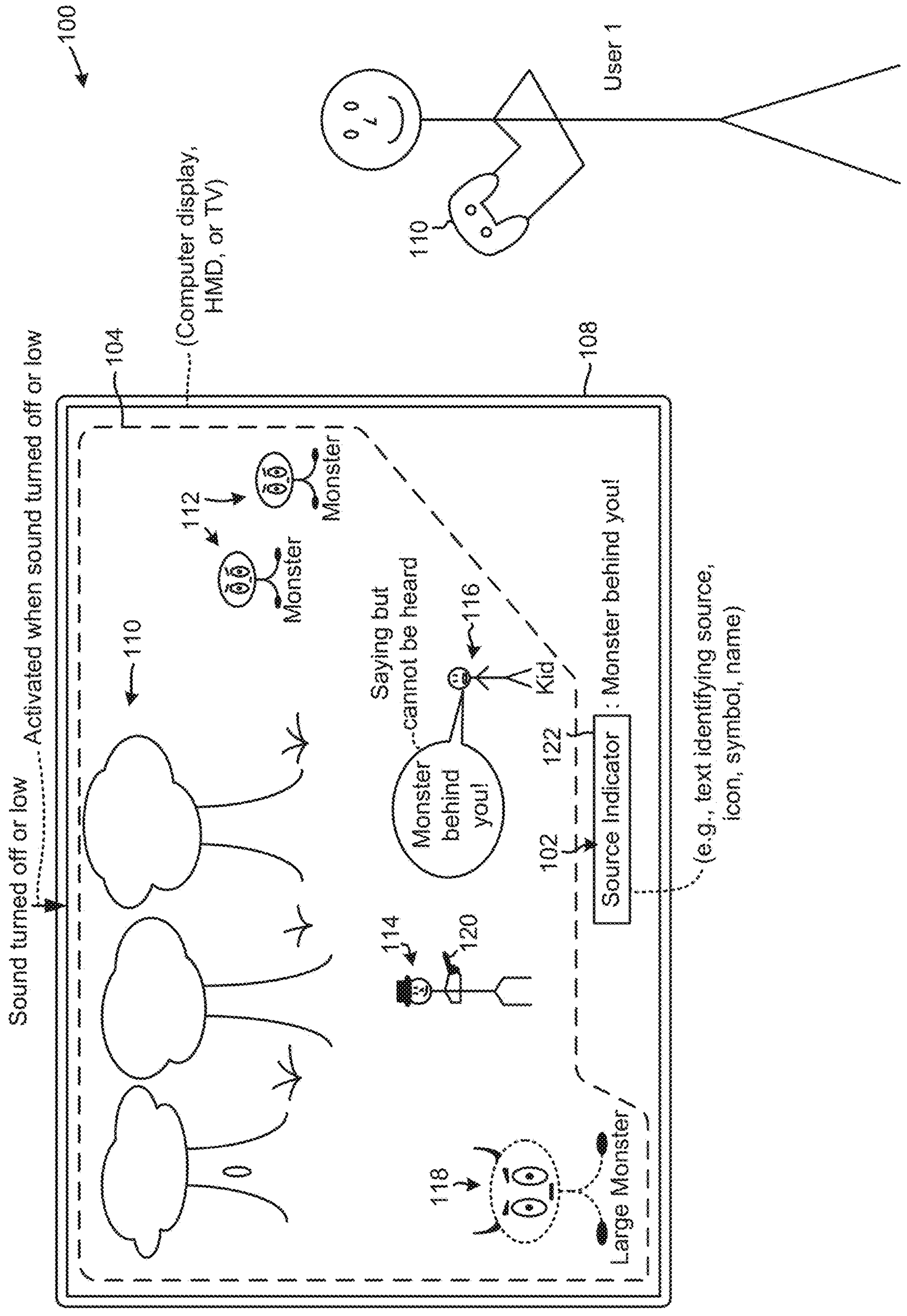
FIG. 1 is a diagram of an embodiment of a system to illustrate a display of a source indicator with a display of a scene.

FIG. 1 is a diagram of an embodiment of a system 100 to illustrate a display of a source indicator 122 with a display of a scene 104. The system 100 includes a display device 108. Examples of the display device 108 include a liquid crystal display (LCD), a light emitting diode (LED) display, and a plasma display. To illustrate, the display device 108 is a head-mounted display (HMD), or a display monitor of a computer, or a display monitor of a smartphone, or a television, or a smart television. The display device 108 includes one or more speakers to output sounds. Examples of a scene, as described herein, include a video scene, a series of images, an audio-only scene, a virtual reality (VR) scene, and an augmented reality (AR) scene.

Moreover, within the system 100, there is a user 1 having a controller 110. Examples of the controller 110 include a remote control for a television and a hand-held controller for playing a video game. As an example, the hand-held controller is coupled to a game console that is further coupled to the display device 108. As another example, in server-based gaming, the hand-held controller is coupled to the display device 108 without the use of the game console. As yet another example, the controller 110 is embedded within the display device 108 when the display device 108 is integrated within the smartphone. It should be noted that the game console, the computer, the smartphone, the television, one or more servers, the smart television, a combination of the game console and the one or more servers, and a combination of the computer and the one or more servers are examples of a computing device system.

The user 1 has a profile associated with a user account 1. For example, the user 1 has a profile 1. In the example, the profile 1 is accessed via the user account 1. Also, in the example, the user 1 accesses the scene 104 after logging into the user account 1. As an example, the profile of a user indicates preferences of the user. To illustrate, the profile 1 indicates that the user 1 is hearing impaired.

The scene 104 is displayed on the display device 108. The scene 104 includes one or more images that are displayed as a part of a television program, or a movie, or a streaming service, such as Netflix™, or the video game. Within the scene 104, there are virtual objects, such as trees 110, monsters 112, a main character 114, a supporting character 116, a large monster 118, and a gun 120.

A processor of the computing device system controls the display device 108 to display the scene 104. While the scene 104 is displayed or before the scene 104 is displayed, the user 1 uses the controller 110 to interact with the scene 104. For example, the user 1 selects one or more buttons on the controller 110 to modify, such as increase or decrease, volumes of sounds output with the scene 104. In the example, the sounds include a sound that is uttered by the main character 114, or a sound that is uttered by the supporting character 116, or a sound that is uttered by the large monster 118, or a sound that is output from the trees 110, or a sound of a virtual bullet shot from the gun 120, or a combination thereof. In the example, the volumes of sounds output with the scene 104 include volumes of sounds that are output via the one or more speakers of the display device 108 simultaneously with a display of the virtual objects of the scene 104.

The processor of the computing device system determines whether the volumes of sounds output with the scene 104 are below a predetermined threshold, such as a predetermined volume. In addition to or instead of determining whether the volumes of sounds are below the pre-determined threshold, the processor of the computing device system determines whether the user 1 is hearing impaired from the profile of the user. For example, the processor of the computing device system accesses the profile of the user 1 to determine that the user 1 is hearing impaired.

An example of the predetermined volume is zero decibels. For example, during a display of the scene 104 on the display device 108, the processor of the computing device system sends a request to a processor of an audio system, such as a processor of an audio mixer, of the display device 108 to determine whether the volume of sounds output via the one or more speakers of the display device 108 is below the predetermined threshold. In the example, the request is for amplitudes of the sounds. In the example, upon receiving the request, the processor of the audio system provides the amplitudes of the sounds to the processor of the computing device. Further, in the example, on one hand, the processor of the computing device compares the amplitudes with the predetermined threshold to determine that the volumes of the sounds output with the scene 104 are not less than the predetermined threshold. In the example, on the other hand, the processor of the computing device compares the amplitudes with the predetermined threshold to determine that the volume of the sounds output with the scene 104 are less than the predetermined threshold. In the example, the processor of the computing device is coupled to the processor of the audio system via a computer network or locally without using the computer network. Moreover, in the example, the processor of the audio system is coupled to the one or more speakers of the display device 108 to control the one or more speakers. In the example, the controller 110 is used by the user 1 to control the processor of the audio system to increase or decrease the volumes of sounds output with the scene 104. In some embodiments, the predetermined threshold can be established using a microphone to determine the level of sound in the environment. Different thresholds can be established for different frequency ranges, such that a different threshold can be used for sounds in the human vocal range to ensure that those sounds are not drowned out by ambient sounds in that range, while sounds in other frequency ranges may not interfere with sounds in the human vocal range as much. When a microphone is used, the predetermined threshold can change as the sound in the environment changes, such as to cause subtitles to start to be displayed when a noisy ventilation system turns on making it harder to hear the audio.

As another example, the processor of the computing device system controls a microphone within a real-world environment in which the display device 108 is situated to obtain audio data generated from sounds in the real-world environment and to determine the predetermined threshold. Upon receiving the audio data, the processor of the computing device system determines a level, such as an amplitude, of the audio data to determine a level of sound in the real-world environment and also applies Fourier transform to the audio data to determine frequencies of the audio data. The processor of the computing device determines that the predetermined threshold is high upon determining that the frequencies of the audio data are more than a predetermined number of frequencies and that the amplitude is greater than a predetermined amplitude. To illustrate, the frequencies of the audio data interfere with sounds in a human vocal range. On the other hand, the processor of the computing device determines that the predetermined threshold is low upon determining that the frequencies of the audio data are less than the predetermined number of frequencies and the amplitude is less than the predetermined amplitude. To illustrate, the frequencies of the audio data do not interfere with sounds in the human vocal range. The high predetermined threshold is greater than the low predetermined threshold. The processor of the computing device system is coupled to the microphone.

It should be noted that the predetermined threshold is an amplitude that is different for different real-world environments. For example, the predetermined threshold is greater for a bar, such as a tavern, compared to a house. As another example, the predetermined threshold is greater for the bar compared to a medical housing facility for hearing-impaired people. The processor of the computing device determines a type of the real-world environment in which the one or more speakers of the display device 108 output the sounds with the scene based on a geographic location of the one or more speakers. For example, the processor of the computing device system identifies the geographic location of the one or more speakers of the display device 108 via a Global Positioning Satellite (GPS) system. To illustrate, the audio system is installed with a GPS tracking system to identify the geographic location of the one or more speakers of the display device 108. In the illustration, both the audio system and the one or more speakers of the display device 108 are located at the same geographic location. In the illustration, the processor of the computing device system communicates via the GPS system with the GPS tracking system of the audio system to determine the geographic location of the audio system and the one or more speakers of the display device 108. In the illustration, based on the geographical location, the processor of the computing device adjusts, such as increases or decreases, the predetermined threshold.

In response to determining that the volumes of sounds are not below the predetermined threshold and that the user 1 does not have preferences within the profile 1, the processor of the computing device system determines not to display information associated with the scene on the display device 108. On the other hand, upon determining that the volumes of sounds output with the scene 104 are below the predetermined threshold or the user 1 has the preferences within the profile 1 or a combination thereof, the processor of the computing device system activates a feature in which information associated with the scene 104 is displayed with a display of the scene 104. For example, the processor of the computing device system determines that the volumes of sounds output are reduced to be below the predetermined threshold before, during or immediately before a time period of utterance of words "Monster behind you!" by the supporting character 116 to the main character 114. In the example, the words are uttered when the large monster 118 is about to attack the main character 114 from a location behind the main character 114 in the scene 104.

An example of the information associated with the scene, such as the scene 104 or a scene output during the audio-only scene, includes a source identifier. The source identifies a virtual object or a character that outputs a sound with an output, such as an audio output via the one or more speakers of the display device 108 or a display, of the scene. To illustrate, an example of the information associated with the scene 104 includes the source identifier 102, which identifies a source, such as the supporting character 116, that utters the words "Monster behind you!". Examples of a source identifier, described herein, include an icon of the source, text indicating the source, one or more alphanumeric characters indicating the source, a symbol indicating the source, a punctuation indicating the source, a name of the source, an image indicating the source, a video identifying the source, a color identifying the source, and an animation identifying the source.

Upon determining that the volumes of sounds are below the predetermined threshold, the processor of the computing device system determines to display the source identifier 102 within a display area 122 on the display device 108. As an example, the source indicator 102 is displayed next to, such as adjacent to and to the left of, the words "Monster behind you!". Examples a display area on a display device in which a scene is displayed include the display area that is on top of the scene, or on bottom of the scene, or to the right of the scene, or to the left of the scene, or at a corner of a display screen of the display device 108, or at an edge of the display screen of the display device 108. Other examples of the display area include a display area that is next to a virtual object from which a sound is output. To illustrate, the display area 122 is next to, such as to the right of, the supporting character 116 that utters the words "Monster behind you!".

In one embodiment, the controller 110 is integrated within the display device 108. For example, one or more buttons of the controller 110 are touch screen buttons of the smartphone.

In an embodiment, the display area 122 is at another location with respect to the scene 104. For example, the display area 122 is above the scene 104 or to the right of the scene 104 or to the left of the scene 104. As another example, the display area 122 is a reserved space on a display screen of the display device 108. In the example, the reserved space is identified by the processor of the computing device system.

In an embodiment, the volumes of sounds are not output with the scene 104 but are output during audio-only programming. There is no scene displayed on the display device 108 during the audio-only programming. For example, the sounds are output by virtual objects, such as the supporting character 116 and the large monster 118, of the scene 104 via the one or more speakers of the display device 108 and the virtual objects are not displayed on the display device 108 during the audio-only programming. As another example, when there is no scene displayed on the display device 108 and only sounds of the scene are output, the scene is sometimes referred to herein as the audio-only scene.

In one embodiment, a scene, as used herein, is a video scene or the audio-only scene. In the audio-only scene used in case of audio-only programming, one or more objects and characters are present but there is no visual display of the objects and the characters. For example, instead of the scene 104, the audio-only scene, which includes the same characters as the virtual objects of the scene 104, outputs the same sounds as that output by the virtual objects in the scene 104 and the music that is played with the scene 104. In the example, only sounds are output from the objects or the characters or a combination thereof via the one or more speakers of the display device 108.

Figure 2:
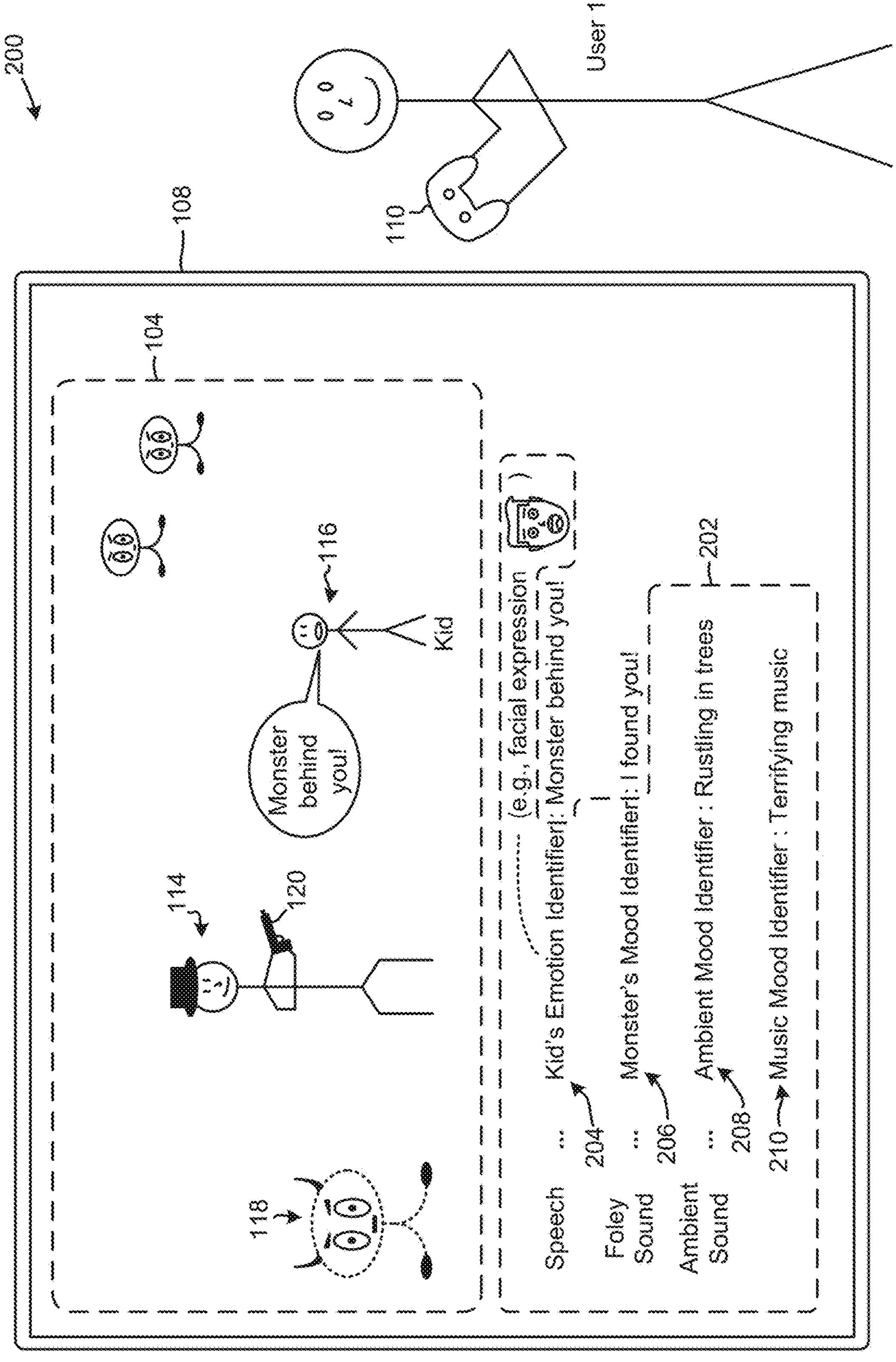
FIG. 2 is a diagram of an embodiment of a system to illustrate a display of one or more emotion identifiers with the display of the scene of FIG. 1.

FIG. 2 is a diagram of an embodiment of a system 200 to illustrate a display of one or more emotion identifiers with the display of the scene 104. Not all virtual objects of the scene 104 are shown in FIG. 2 to avoid cluttering the figure. The system 200 includes the display device 108.

Another example of the information associated with the scene includes an emotion identifier that indicates an emotion or a mood or a feeling of one or more virtual objects within the scene. To illustrate, an example of the information associated with the scene 104 includes an emotion identifier 204 that indicates an emotion of the supporting character 116. In the illustration, an example of the information associated with the scene 104 includes an emotion identifier 206 that indicates an emotion of the large monster 118. Further, in the illustration, an example of the information associated with the scene 104 includes an emotion identifier 208 that indicates an emotion of an ambient sound that is output by a virtual background within the scene 104. Examples of the virtual background include one or more virtual objects, such as the trees 110 (FIG. 1), a virtual water stream, virtual birds, a virtual washing machine, a virtual airplane, etc., within the scene 104 that provide a scenery to another virtual object, such as the main character 114 or the supporting character 116, within the scene 104. The virtual background provides an ambience, such as a surrounding or a virtual environment, to one or more virtual objects, such as the main character 114, in the scene 104. Also, in the illustration, an example of the information associated with the scene 104 includes an emotion identifier 210 that indicates an emotion of music, such as a musical soundtrack or background music, that is output with a display of the scene 104. Examples of an emotion identifier, described herein, include an icon indicating the emotion, text indicating the emotion, one or more alphanumeric characters indicating the emotion, a symbol indicating the emotion, a name of the emotion, a virtual facial expression indicating the emotion, an emoji indicating the emotion, a punctuation indicating the emotion, an image indicating the emotion, a video identifying the emotion, and an animation identifying the emotion. The processor of the computing device system modifies the animation with a change in the emotion.

Upon determining that the volumes of sounds are below the predetermined threshold or upon determining that the user 1 is hearing impaired or a combination thereof, the processor of the computing device system determines to display the one or more emotion identifiers within a display area 202 on the display device 108. For example, the emotion identifier 204, is displayed within the display area 202, and next to the words, "Monster behind you!". In the example, the emotion identifier 204 indicates an emotion, such as fear or concern, of the supporting character 116 while the supporting character 106 utters the words, "Monster behind you!". As another example, the emotion identifier 206, is displayed within the display area 202, and next to words, "I found you!", which are uttered by the large monster 118. In the example, the emotion identifier 206 indicates an emotion, such as anger or madness, of the large monster 118 while the large monster 118 utters the words, "I found you!".

As yet another example, the emotion identifier 208 is displayed within the display area 202 and next to words, “Rustling in trees”. In the example, the rustling in trees is a sound output by the trees 110 (FIG. 1). In the example, the emotion identifier 208 indicates an emotion, such as surprise or calmness, of the trees 110 while the trees 110 output the rustling sound in the scene 104. As still another example, the emotion identifier 210, is displayed within the display area 202, and next to words, “Terrifying music”. In the example, emotion identifier 210 identifies an emotion of music that is output with a display of the scene 104. As another example, “Terrifying music” is a part of the emotion identifier 210.

In an embodiment, the display area 202 is displayed instead or in addition to the display area 122 (FIG. 1). For example, the display area 202 is displayed below the display area 122 or above the display area 122. As another example, display area 202 is a reserved space on the display screen of the display device 108. In the example, the reserved space is identified by the processor of the computing device system.

In an embodiment, the display area 202 is at another location with respect to the scene 104. For example, the display area 202 is above the scene 104 or to the right of the scene 104 or to the left of the scene 104 or at a corner of the display screen of the display device 108 or at an edge of the display screen of the display device 108.

Figure 3:
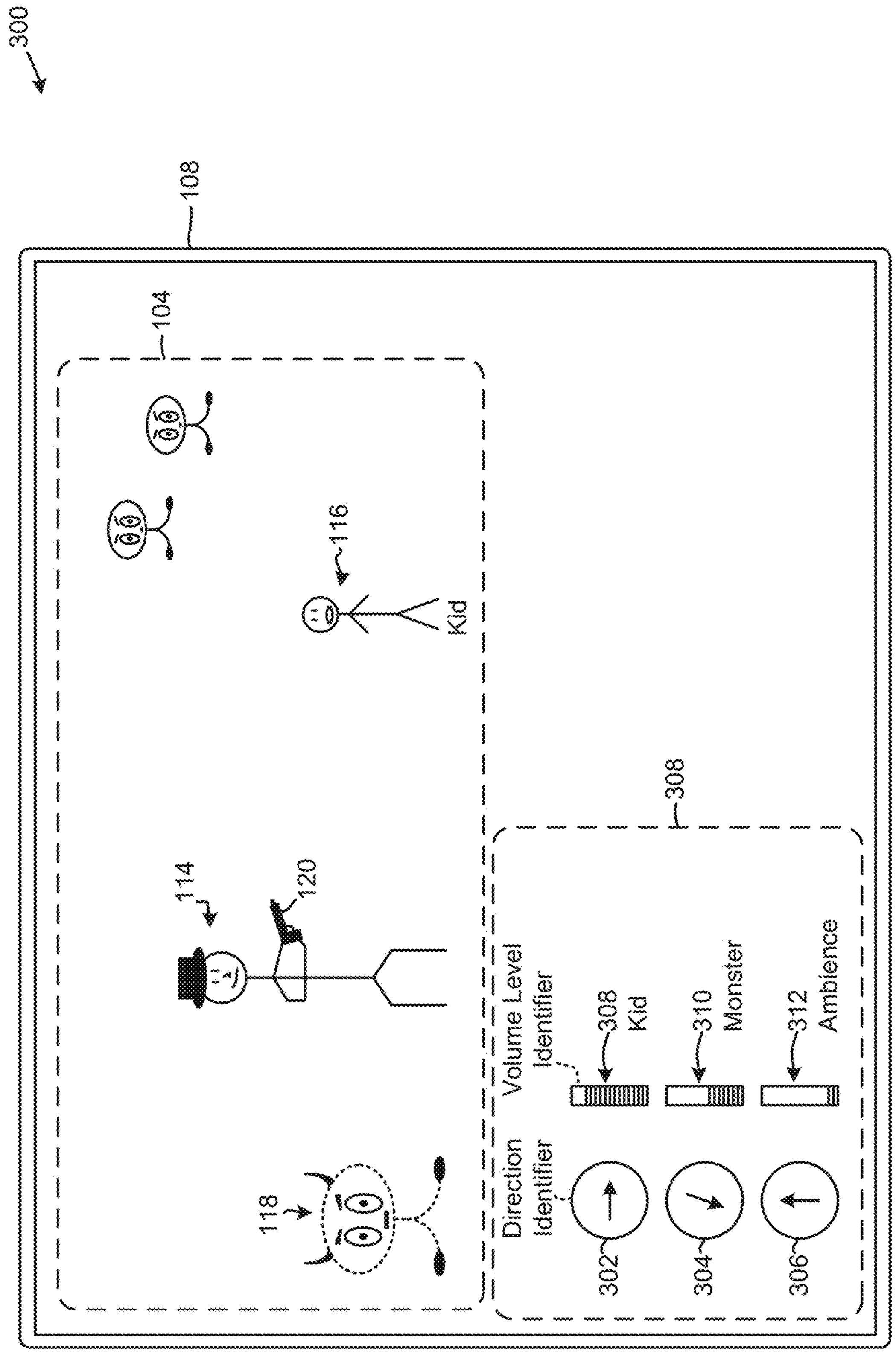
FIG. 3 is a diagram of an embodiment of a system to illustrate a display of at least one direction of at least one sound that is emitted within the scene of FIG. 1 and a display of at least one intensity of the at least one sound.

FIG. 3 is a diagram of an embodiment of a system 300 to illustrate a display of at least one direction of at least one of the sounds that are output with the scene 104 and a display of at least one intensity, such as at least one amplitude, of the at least one of the sounds. The system 300 includes the display device 108. Again, not all virtual objects of the scene 104 are shown in FIG. 3 to avoid cluttering the figure.

Yet another example of the information associated with the scene includes a direction identifier that indicates a direction of a source of a sound output with a display of the scene. In the example, the direction is determined by the processor of the computing device system relative to a reference object, such as a virtual object, in the scene. To illustrate, an example of the information associated with the scene 104 includes a direction identifier 302 that indicates a direction of sound that is uttered by the supporting character 116. In the illustration, an example of the information associated with the scene 104 includes a direction identifier 304 that indicates a direction of sound that is uttered by the large monster 118. Also, in the illustration, an example of the information associated with the scene 104 includes a direction identifier 306 that indicates a direction of sound that is output from the virtual background of the scene 104. Examples of the direction identifier, described herein, include an icon, text, one or more alphanumeric characters, a symbol, a punctuation, a name, a virtual facial expression, an emoji, an image, a video, and an animation.

Another example of the information associated with the scene includes a volume level indicator that indicates a level, such as an amplitude, of a sound output with a display of the scene. To illustrate, an example of the information associated with the scene 104 includes a volume level indicator 308 that indicates a volume, such as intensity or amplitude, of sound that is uttered by the supporting character 116. In the illustration, an example of the information associated with the scene 104 includes a volume level indicator 310 that indicates a volume of sound that is uttered by the large monster 118. Also, in the illustration, an example of the information associated with the scene 104 includes a volume level indicator 312 that indicates a volume of sound that is output from the virtual background. Examples of the volume level indicator, described herein, include an icon, text, one or more alphanumeric characters, a symbol, a name, a virtual facial expression, an emoji, an image, a punctuation, a video, and an animation.

Upon determining that the volumes of sounds are below the predetermined threshold, the processor of the computing device system determines to display the one or more direction identifiers or the one or more volume level indicators or a combination thereof within a display area 308 on the display device 108. For example, the direction indicator 302, is displayed within the display area 308, to indicate that the supporting character 116 is to the right of the main character 114. In the example, the direction indicator 304, is displayed within the display area 308, to indicate that the large monster 118 is in a lower left direction compared to the main character 114. As another example, the direction indicator 306, is displayed within the display area 308, to indicate that the trees 110 (FIG. 1) are above the main character 114.

As yet another example, the volume level indicator 302, is displayed within the display area 308, to indicate that an intensity of sound emitted by the supporting character 116 is the highest compared to an intensity of sound emitted by the large monster 310 and an intensity of sound emitted by the trees 110. As another example, the volume level indicator 310, is displayed within the display area 308, to indicate that an intensity of sound emitted by the large monster 310 is the lower compared to an intensity of sound emitted by the supporting character 116 but greater compared to an intensity of sound emitted from the trees 110.

In an embodiment, the display area 308 is displayed instead or in addition to one or more of the display areas 122 (FIG. 1) and 202 (FIG. 2). For example, the display area 308 is displayed below the display area 122 or above the display area 122. As another example, the display area 308 is displayed below the display area 202 or above the display area 202.

In an embodiment, the display area 308 is at another location with respect to the scene 104. For example, the display area 308 is above the scene 104 or to the right of the scene 104 or to the left of the scene 104 or at a corner of the display screen of the display device 108 or at an edge of the display screen of the display device 108. As another example, display area 308 is a reserved space on a display screen of the display device 108. In the example, the reserved space is identified by the processor of the computing device system. As yet another example, a video that shows information on the screen in a particular location, such as from a first-person perspective of a character wearing a heads-up display (HUD), such as a head-mounted display, or a game with a scoreboard area, can position display area 308 to be near the particular location on the screen where other information is shown.

In one embodiment, although virtual objects are used herein, instead of each of the virtual objects, an image of a person or an image of an object is used herein. For example, in case of television programming or a movie, instead of virtual objects, an image of a person or an image of an object is used.

In an embodiment, a combination of virtual objects, an image of a person, and an image of an object is used instead of virtual objects. For example, in case of television programming or a movie, in addition to virtual objects, an image of a person or an image of an object or a combination thereof is used.

Figure 4:
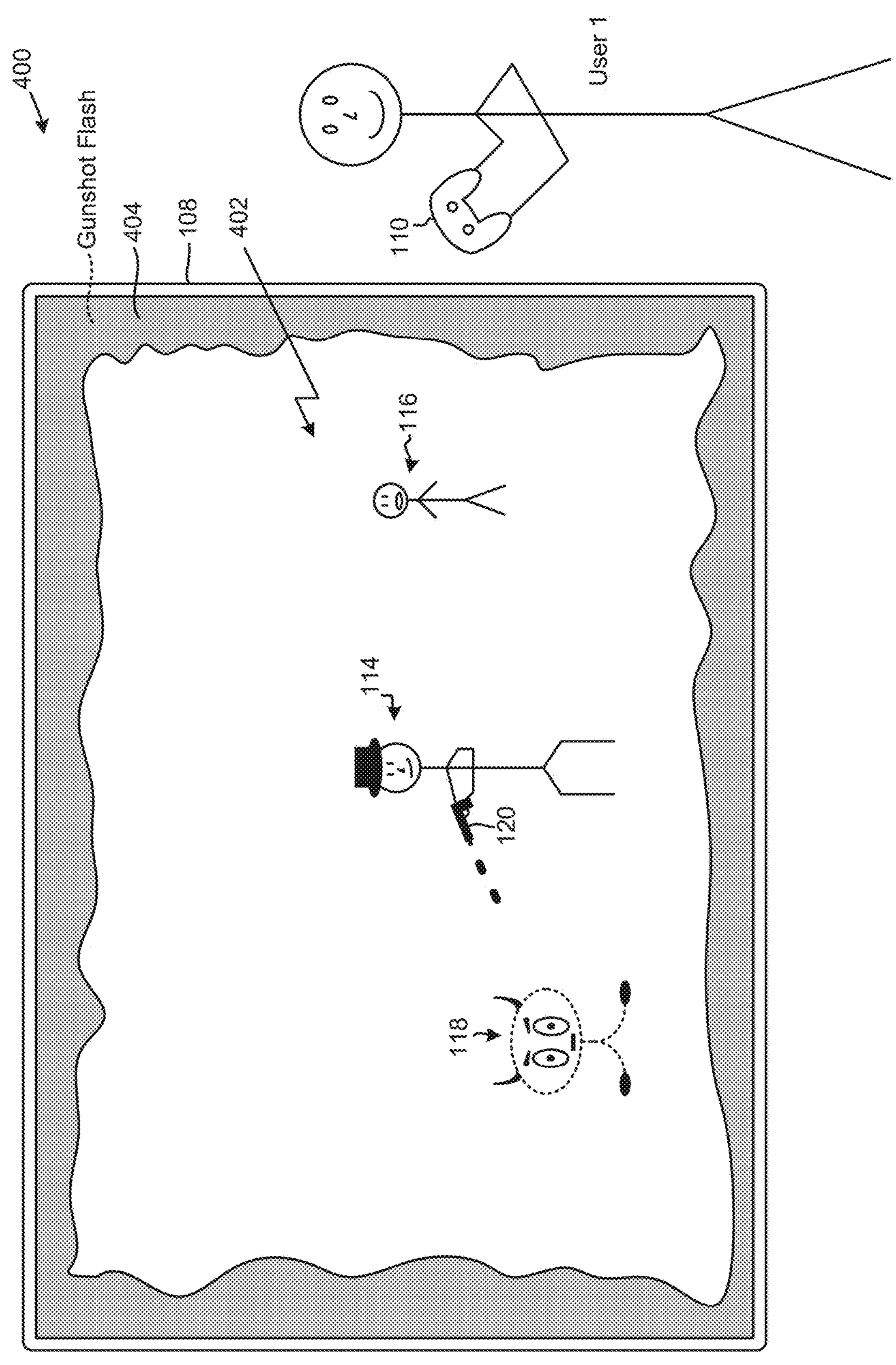
FIG. 4 is a diagram of an embodiment of a system to illustrate a display of at least one border that is displayed with a display of a scene.

FIG. 4 is a diagram of an embodiment of a system 400 to illustrate a display of at least one border that is displayed with a display of a scene 402. The system 400 includes the display device 108.

The scene 402 is generated by the processor of the computing device system for display on the display device 108 after the display of the scene 104 (FIG. 3). After being prompted, via the display of the words "Monster behind you!", by the supporting character 116 to look out for the large monster 118, the user 1 views the prompt on the display device 108 and controls one or more buttons on the controller 110 to control movement of the main character 114. The movement of the main character 114 is controlled to point the main character 114 towards the large monster 118. Furthermore, the user 1 selects one or more buttons on the controller 110 to shoot virtual bullets from the virtual gun 120 at the large monster 118 in the scene 402.

When the virtual bullets are shot, the processor of the computing device system controls the display device 108 to generate a border 404, such as a flashing border or a highlighted border or a stationary border, around the scene 402. The border 404 is an indication or an identifier, such as a sudden noise identifier, of shooting of the virtual bullets. For example, the border 404 flashes with a sound output from the one or more speakers of the display device 108 with the shooting of the virtual bullets. In the example, the sound is below the pre-determined threshold. To illustrate, upon determining that the volumes of sounds are below the predetermined threshold, the processor of the computing device system determines to display the border 404 surrounding the large monster 118, the main character 114, and the supporting character 116 of the scene 402 on the display device 108.

In one embodiment, sudden noise is sometimes referred to herein as Foley noise.

In an embodiment, the border 404 is displayed instead or in addition to one or more of the display areas 122 (FIG. 1), 202 (FIG. 2), and 308 (FIG. 3).

In an embodiment, the processor of the computing device system controls the display device 108 to flash a portion of the display screen of the display device 108 with the sound regarding the shooting of the virtual bullets output from the one or more one or more speakers of the display device 108.

In one embodiment, the processor of the computing device system generates a border to be displayed around one or more of the virtual bullets being shot to highlight the sound output with the shooting of the one or more of the virtual bullets.

In an embodiment, the processor of the computing device system indicates that different colors be used for different borders to correspond to different sources for the sudden noise.

In one embodiment, the processor of the computing device generates display data for displaying a thick border around the large monster 118 when the large monster 118 is closer to the main character 118 compared to the supporting character 116. The thick border indicates prominence and loudness of sounds uttered by the large monster 118 to indicate urgency of defeating the large monster 118.

In an embodiment, the processor of the computing device generates display data for displaying a border surrounding the main character 114. The border has different portions of a border to convey different information. For example, a left portion of the border is red to indicate that the large monster 118 is to the left of the main character 114 and a right portion of the border is green to indicate that the supporting character 116 is to the right of the main character 116. In the example, when the large monster 118 moves to the right of the main character 114 and the supporting character 116 moves to the left of the main character 114, the processor of the computing device generates display data for displaying the left portion of the border to be green and the right portion of the border to be red.

Figure 5:
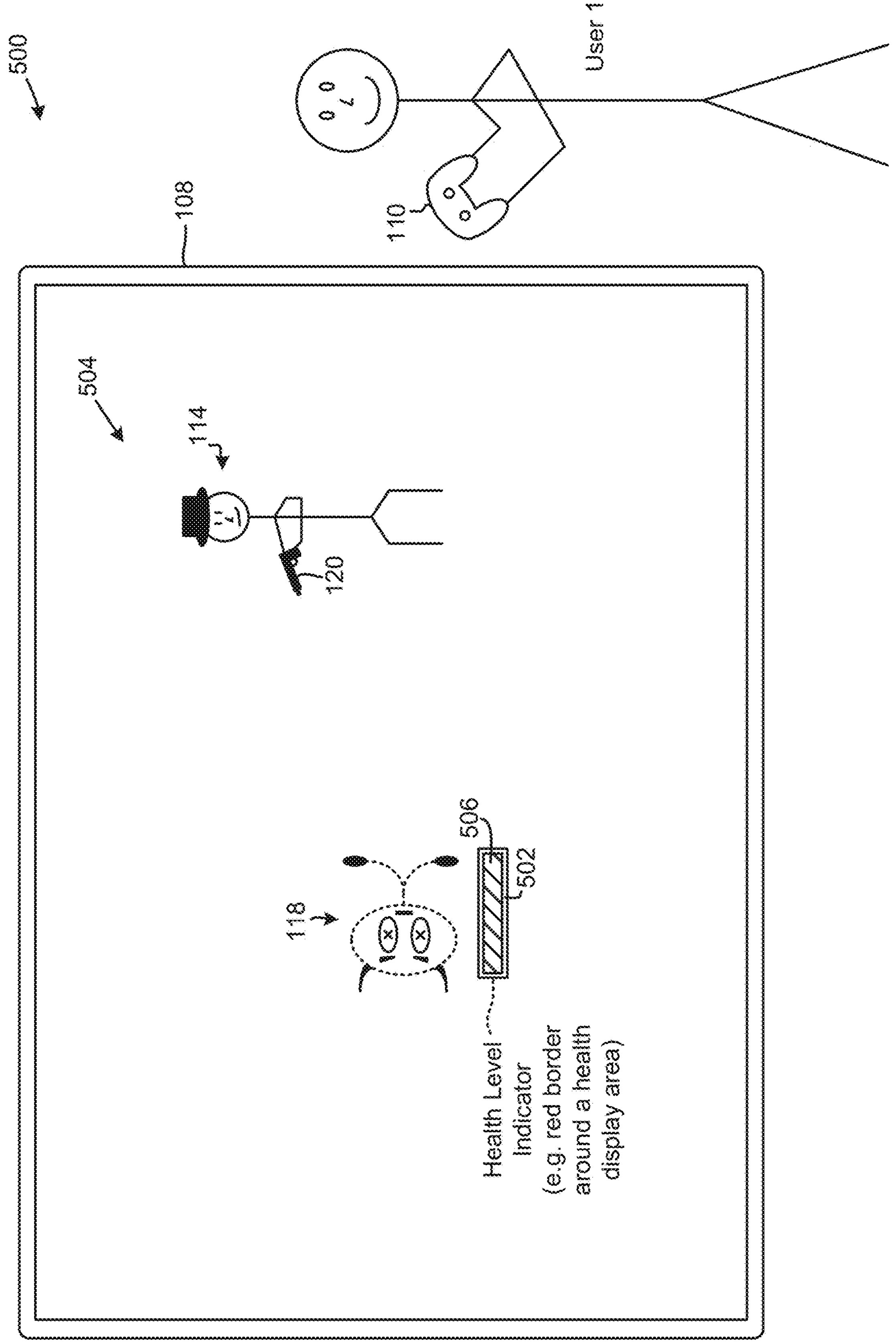
FIG. 5 is a diagram of an embodiment of a system to provide another example of a border displayed with a display of a scene.

FIG. 5 is a diagram of an embodiment of a system 500 to provide another example of a border 502 displayed with a display of a scene 504. The system 500 includes the display device 108.

The scene 504 is generated by the processor of the computing device system for display on the display device 108 after the display of the scene 402 (FIG. 4). After the large monster 118 is shot and defeated with the virtual bullets, the processor of the computing device system controls the display device 108 to display the scene 504 in which the large monster 118 lays dead in a horizontal position on a virtual ground. With the display of the horizontal position, the processor of the computing device system controls the display 108 to display a health level indicator 506 of the large monster 118. Also, the processor of the computing device system controls the display to display the border 502 around the health level indicator 506 to highlight a virtual death of the large monster 118. As an example, the border 502 flashes or is stationary or shimmers. In the example, the border 502 shimmers as the large monster 118 slowly dies. To illustrate, the border 502 has a color red, which has a different shade or the same shade, as that of a color of the health level indicator 506.

In an embodiment, the border 502 is displayed instead or in addition to one or more of the display areas 122 (FIG. 1), 202 (FIG. 2), and 308 (FIG. 3).

In one embodiment, when the large monster 118 is healed, the processor of the computing device displays a green border around a health display area to indicate that large monster 118 is healed.

In an embodiment, a border, described herein, has art-deco edges, or frayed edges, or is lacy looking and is full of holes.

In one embodiment, a border, described herein, is a combination border having multiple components. To illustrate, a border with polka-dots on it conveys one type of information with a background of the border while the polka-dots conveys information about a different aspect through factors, such as their color, number, density, size, shape, and a percentage of the border occupied by the polka-dots.

Figure 6:
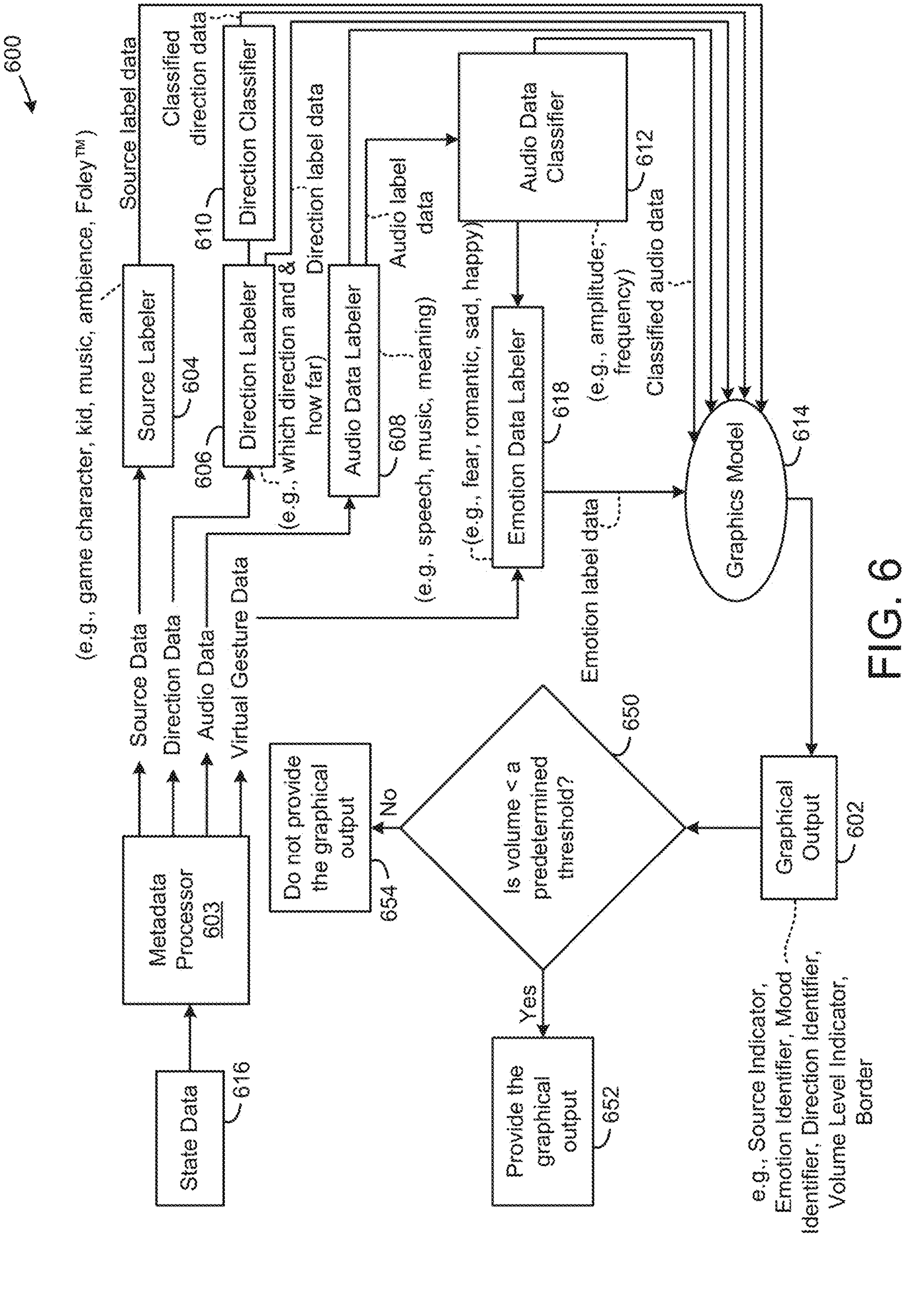
FIG. 6 is a diagram of an embodiment of a system to illustrate generation of a graphical output by one or more processors of a computing device system.

FIG. 6 is a diagram of an embodiment of a system 600 to illustrate dynamic generation of a graphical output 602 by one or more processors of the computing device system. The system 600 includes a metadata processor 603, a source labeler 604, a direction labeler 606, an audio data labeler 608, a direction classifier 610, an audio data classifier 612, an emotion data labeler 618, a graphics model 614. As an example, each of the source labeler 604, the direction labeler 606, the audio data labeler 608, the direction classifier 610, the audio data classifier 612, the emotion data labeler 618, and the graphics model 614 is a hardware component or a software component. To illustrate, each of the source labeler 604, the direction labeler 606, the audio data labeler 608, the direction classifier 610, the audio data classifier 612, the emotion data labeler 618, and the graphics model 614 is a software program or a portion of a software program that is executed by an artificial intelligence (AI) processor. To further illustrate, the graphics model 614 is a machine learning model or a neural network or an AI model. As another illustration, each of the source labeler 604, the direction labeler 606, the audio data labeler 608, the direction classifier 610, the audio data classifier 612, and the graphics model 614 is a hardware circuit portion of an application specific integrated circuit (ASIC) or a programmable logic device (PLD). The AI processor and the metadata processor 402 are examples of the one or more processors of the computing device system.

The metadata processor 603 is coupled to the source labeler 604, the direction labeler 606, the audio data labeler 608, and the emotion data labeler 618. Also, the direction labeler 606 is coupled to the direction classifier 610 and the audio data labeler 608 is coupled to the audio data classifier 612. The source labeler 604, the direction classifier 610, the emotion data labeler 618, the audio data classifier 608 are coupled to the graphics model 614. Also, the audio data classifier 612 is coupled to the emotion data labeler 618.

The one or more processors of the computing device system collect state data 616 during the displays of each of the scenes 104 (FIGS. 1-3), 402 (FIG. 4), and 504 (FIG. 5). For example, during the display of the scene 104, the one or more processors of the computing device system identify a first virtual object, such as the supporting character 116, that outputs the words, "Monster behind you!", and stores the words in one or more memory devices of the computing device system. In the example, the supporting character 116 is an example of a source of the sound output using the words, "Monster behind you!". Further, in the example, the one or more processors assign a source indicator source 1 to the supporting character 116, and stores the source indicator source 1 in the one or more memory devices of the computing device system. Also, in the example, the one or more processors assign an alphanumeric identifier, such as alphanumeric 1, to the words, "Monster behind you!", and stores the alphanumeric identifier in the one or more memory devices of the computing device system. In the example, during the display of the scene 104, the one or more processors of the computing device system identify a second virtual object, such as the large monster 118, that outputs the words, "I found you!", and store the words in the one or more memory devices of the computing device system. Further, in the example, the one or more processors assign a source indicator source 2 to the large monster 118, and store the source indicator source 2 in the one or more memory devices of the computing device system. Also, in the example, the one or more processors assign an alphanumeric identifier, such as alphanumeric 2, to the words, "I found you!", and stores the alphanumeric identifier in the one or more memory devices of the computing device system. In the example, the one or more processors identify that music is output with the scene 104, assign a source indicator Source3 to the music, and store the source indicator Source3 in the one or more memory devices of the computing device system. Also, in the example, the one or more processors assign an alphanumeric identifier, such as alphanumeric 3, to the music and stores the alphanumeric identifier in the one or more memory devices of the computing device system.

As another example, during the display of the scene 104, the one or more processors of the computing device system identify one or more virtual gestures, such as facial expressions or body language, or a combination thereof, of one or more virtual objects, such as the supporting character 116, or the large monster 118, or the main character 114, in the scene 104, that output the one or more sounds, and store the one or more virtual gestures in the one or more memory devices of the computing device system. In the example, the one or more processors assign an identifier, such as gesture 1, to the one or more virtual gestures performed by a virtual object in the scene 104, and store the identifier in the one or more memory devices of the computing device system.

As yet another example, during the display of the scene 104, the one or more processors of the computing device system identify a location, such as a position and an orientation, of a virtual object in the scene 104 relative to the reference object, such as the main character 114, in the scene 104, and store the location in the one or more memory devices of the computing device system. In the example, the one or more processors assign an identifier Location1 to the location of the virtual object, and stores the identifier in the one or more memory devices of the computing device system.

As another example, during the display of the scene 104, the one or more processors of the computing device system identify an amplitude, such as a magnitude, of sound that is output from a virtual object in the scene 104, and store the amplitude in the one or more memory devices of the computing device system. Also, in the example, the one or more processors assign an amplitude identifier, such as amplitude 1, to the amplitude of sound and stores the amplitude identifier in the one or more memory devices of the computing device system. As another example, during the display of the scene 104, the one or more processors of the computing device system identify an amplitude of sound of music output with a display of the scene 104, and store the amplitude in the one or more memory devices of the computing device system. Also, in the example, the one or more processors assign an amplitude identifier, such as amplitude2, to the amplitude of music and stores the amplitude identifier in the one or more memory devices of the computing device system. As yet another example, during the display of the scene 402, the one or more processors of the computing device system identify a Foley sound, such as a sudden noise or a sudden sound, that is output with a display of the scene 402, and store audio data output as the Foley sound within the one or more memory devices of the computing device system. In the example, the one or more processors assign an identifier, such as Foley 1, to the audio data output as the Foley sound, and store the identifier in the one or more memory devices. As still another example, during the display of the scene 504, the one or more processors of the computing device system identify an amplitude of the health level indicator indicating a health of the large monster 118, and store the amplitude in the one or more memory devices of the computing device system. In the example, the one or more processors assign an identifier, such as amp1, to the amplitude of the health level indicator, and store the identifier in the one or more memory devices.

As yet another example, during the display of the scene 104, the one or more processors of the computing device system identify a speech, such as an utterance of words, that is output with a display of the scene 104, and store audio data output as the speech within the one or more memory devices of the computing device system. In the example, the one or more processors assign an identifier, such as Speech 1, to the audio data output as the speech, and store the identifier in the one or more memory devices.

As yet another example, during the display of the scene 104, the one or more processors of the computing device system identify music, such as musical notes or a musical soundtrack, that is output with a display of the scene 104, and store audio data output as the music within the one or more memory devices of the computing device system. In the example, the one or more processors assign an identifier, such as Music1, to the audio data output as the music, and store the identifier in the one or more memory devices.

As still another example, during the display of the scene 104, the one or more processors of the computing device system identify an ambience sound that is output with a display of the scene 104, and store audio data output as the ambience sound within the one or more memory devices of the computing device system. In the example, the one or more processors assign an identifier, such as Ambience 1, to the audio data output as the ambience sound, and store the identifier in the one or more memory devices.

The metadata processor 616 accesses the state data 616 from the one or more memory devices of the computing device system and parses the state data 616 to distinguish among a first set having source data identifying the sources of sounds within the scenes 104, 402, and 504, a second set having virtual gesture data including the one or more virtual gestures of the one or more virtual objects in the scenes 104, 402, and 504, a third set having direction data including locations of the one or more virtual objects with respect to the reference object in the scenes 104, 402, and 504, and a fourth set having audio data including the alphanumeric characters and amplitudes identifying the sounds output within the scenes 104, 402, and 504. For example, upon determining that data within the one or more memory devices has the identifiers source 1 and source 2, the one or more processors determine that the data is the source data. In the example, upon determining that data within the one or more memory devices has the identifier gesture 1, the one or more processors determine that the data is the gesture data.

Further, in the example, upon determining that data within the one or more memory devices has the identifier Location1, the one or more processors determine that the data is the direction data. In the example, upon determining that data within the one or more memory devices has the identifier alphanumeric 1 or the identifiers amplitude 1 and speech 1, the one or more processors determine that the data is the audio data of the speech. In the example, upon determining that data within the one or more memory devices has the identifier amplitude 1 and Foley 1, the one or more processors determine that the data is the audio data of the Foley sound. Further, in the example, upon determining that data within the one or more memory devices has the identifiers amplitude 1 and music 1, the one or more processors determine that the data is the audio data of the music. Also, in the example, upon determining that data within the one or more memory devices has the identifiers amplitude 1 and Ambience 1, the one or more processors determine that the data is the audio data of the ambient sound.

The direction data of the third set includes an identification of a speaker, such as a right speaker or a left speaker, of the display device 108 that outputs a sound. For example, the one or more processors of the computing device system sends a request to the processor of the audio system of the display device 108 to identify the speaker that is outputting a sound with the scene 104. In the example, upon receiving the request, the processor of the audio system provides the identification of the speaker, such as the left speaker or the right speaker, to the one or more processors of the computing device system. In the example, upon receiving the identification, the one or more processors of the computing device system identify the speaker that outputs the sound.

The metadata processor 616 provides the first set of source data to the source labeler 604, the second set of virtual gesture data and the audio data to the emotion data labeler 618, the third set of direction data to the direction labeler 606, and the fourth set of audio data to the audio data labeler 608. The source labeler 604 identifies each source of the source data to label the source in the scenes 104, 402, and 504. For example, the source labeler 604 determines that the source 1 identifies the supporting character 116 and the source 2 identifies the large monster 118 to output source label data.

Moreover, the emotion data labeler 618 determines an emotion of a source in each of the scenes 104, 402, and 504 from the virtual gesture data, or the audio data, or a combination thereof to output emotion label data for the scene. For example, the emotion data labeler 618 compares the virtual gesture data of the supporting character 116 with predetermined gesture data identifying fear, and determines that the virtual gesture data is similar to or matches the predetermined gesture data to further determine that the virtual gesture data indicates fear. The indication of fear is an example of the emotion label data. As another example, the emotion data labeler 618 compares the virtual gesture data of the large monster 118 with predetermined gesture data identifying anger, and determines that the virtual gesture data is similar to or matches the predetermined gesture data to further determine that the virtual gesture data indicates anger. The indication of anger is an example of the emotion label data.

Also, the direction labeler 606 receives the direction data from the metadata processor 603 and determines a direction of output of each sound with each of the scenes 104, 402, and 504 to provide direction label data. For example, the direction labeler 606 determines that the supporting character 116 that utters the words, "Monster behind you!", is to the right of the main character 114. To illustrate, the direction labeler 606 identifies that a co-ordinate of the reference object is (0, 0, 0) in the scene 104 and a co-ordinate of the supporting character 116 is (3, 0, 0). In the illustration, the co-ordinates (0, 0, 0) and (3, 0, 0) are locations of the main character 114 and the supporting character 116, respectively. In the illustration, the direction labeler 606 determines that the supporting character 116 is 3 units along an x-axis in the scene 104 to further determine that the supporting character 116 is to the right of the reference object. The co-ordinate (3, 0, 0) is an example of the direction label data. As another example, the direction labeler 606 determines that the large monster 118 that utters the words, "I found you!", is to the lower left of the main character 114. To illustrate, the direction labeler 606 identifies that the co-ordinate of the reference object is (0, 0, 0) in the scene 104 and a co-ordinate of the large monster 118 is (−5, −3, 0). In the illustration, the co-ordinates (0, 0, 0) and (−5, −3, 0) are locations of the main character 114 and the large monster 118, respectively. In the illustration, the direction labeler 606 determines that the large monster 118 is 5 units along the x-axis in the scene 104 and is 3 units along a y-axis in the scene 104 to further determine that the large monster 118 is to the lower left of the reference object. The co-ordinate (−5, −3, 0) is an example of the direction label data. As another example, the direction labeler 606 determines that a sound is output by the support character 116 from the right speaker to determine that the sound is output from the right of the main character 114.

The direction labeler 606 provides the direction label data to the direction classifier 610 to output classified direction data. The direction classifier 610 determines a distance of sound emitted from a source of the sound in each of the scenes 104, 402, and 504, based on the direction label data. For example, the direction classifier 610 determines, from the locations of the supporting character 116 and the reference object, that a distance between the supporting character 116 and the reference object along the x-axis is less than a distance between the large monster 118 and the reference object along the x-axis to determine that the supporting character 116 is closer to the reference object than the large monster 118. The closeness of the distance is an example of the classified direction data. As another example, the direction classifier 610 determines that an amplitude of the sound output from the large monster 118 is lower than an amplitude of the sound output from the supporting character 116 to determine that the large monster 118 is further away from the main character 114 compared to the large monster 118.

Moreover, the audio data labeler 608 receives the fourth set of audio data from the metadata processor 603 and determines that audio data based on which a sound is output by a virtual object or music within each of the scenes 104, 402, and 504 is either alphanumeric characters, such as words or numbers or punctuation marks, or music, such as musical notes, or the ambient sound or the Foley sound to output audio label data. For example, the audio data labeler 608 determines that the terms, "Monster behind you!" are words and a punctuation mark, and further determines a meaning of the terms. To illustrate, the audio data labeler 608 accesses an online web-based dictionary to determine the meaning. In the illustration, the on-line web-based dictionary includes synonyms of the terms. In the example, the words, the punctuation mark, and the meaning of the terms are examples of the audio label data. As another example, the audio data labeler 608 determines words of the musical soundtrack by comparing the words to prestored words. In the example, the audio data labeler 608 compares notes of the music or of the ambient sound or of the Foley sound with predetermined notes to identify the notes. In the example, when the notes match the predetermined notes, the notes are labeled, such as identified. The words of the musical soundtrack or the speech and the musical notes are examples of the audio label data. The audio data labeler 608 provides the audio label data to the audio data classifier 612.

In addition, the audio data classifier 612 classifies the audio label data to output classified audio data. For example, the audio data classifier 612 compares an amplitude of the words or sounds uttered by a virtual object of the scene 104 or the music output with the scene 104 with a predetermined amplitude to determine whether the amplitude exceeds the predetermined amplitude. In the example, upon determining that the amplitude exceeds the predetermined amplitude, the audio data classifier 612 classifies the amplitude as high. On the other hand, upon determining that the amplitude does not the predetermined amplitude, the audio data classifier 612 classifies the amplitude as low. As another example, the audio data classifier 612 applies Fourier transform to the audio label data to determine a frequency of the audio label data. To illustrate, the audio data classifier 612 applies fast Fourier transform to the notes or to sounds or to utterance of words to determine a frequency of occurrence of the notes or the sounds or the utterance of words. In the example, the audio data classifier 612 further compares the frequency with a predetermined frequency to determine that the frequency exceeds the predetermined frequency or is below the predetermined frequency. Upon determining that the frequency exceeds the predetermined frequency, the audio data classifier 612 classifies the frequency as high. On the other hand, upon determining that the frequency does not exceed the predetermined frequency, the audio data classifier 612 classifies the frequency as low. The high amplitude, the low amplitude, the high frequency, and the low frequency are examples of the classified audio data. To illustrate, the high frequency of breathing of the large monster 118 indicates heavy breathing by the virtual monster 118 to indicate that the large monster 118 is about to die. As another illustration, the low frequency, such as zero frequency, indicates a death of the large monster 118.

The audio data classifier 612 provides the classified audio data to the emotion data labeler 618. In addition to or instead of the virtual gesture data, the emotion data labeler 618 applies the classified audio data to output the emotion label data. For example, upon determining that the words, "Monster behind you" are uttered with the high amplitude and the high frequency, the audio data classifier 612 determines that the words are uttered to express fear. As another example, upon determining that the words, "Monster behind you" are uttered with the low amplitude and the low frequency, the audio data classifier 612 determines that the words are uttered to express sadness. As yet another example, upon determining that the notes have the high amplitude and the high frequency, the audio data classifier 612 determines that the musical notes indicate fear. The indications of fear and sadness are examples of the emotion label data.

The source labeler 604 provides the source label data to the graphics model 614, the direction labeler 606 provides the direction label data to the graphics model 614, the direction classifier 610 provides the classified direction data to the graphics model 614, the audio data labeler 608 provides the audio label data to the graphics model 614, the audio data classifier 612 provides the classified audio data to the graphics model 614, and the emotion data labeler 618 provides the emotion label data to the graphics model 614. In addition, the graphics model 614 receives the profile 1 of the user 1.

The graphics model 614 generates the graphical output 602 based on one or more of the source label data, the emotion label data, the direction label data, the classified direction data, the audio label data, the classified audio data, and the profile 1 of the user 1. For example, the graphics model 614 generates display data of the source indicator 122 (FIG. 1) to identify the source of the sound output by the supporting character 116 upon receiving the source label data indicating that the words, "Monster behind you!" are output by the supporting character 116. As another example, the graphics model 614 generates display data of the emotion identifier 204 (FIG. 2) upon receiving the emotion label data indicating that the supporting character 114 utters the words "Monster behind you!" out of fear. In the example, the graphics model 614 generates display data of the emotion identifier 204 (FIG. 2) upon receiving the emotion label data indicating that the large monster 118 utters the words "I found you!" out of anger. Also, in the example, the graphics model 614 generates display data of the emotion identifier 206 (FIG. 2) upon receiving the emotion label data indicating that the trees 110 (FIG. 1) utter a sound indicating fear. Furthermore, in the example, the graphics model 614 generates display data of the emotion identifier 210 (FIG. 2) upon receiving the emotion label data indicating that the music expresses fear.

As yet another example, the graphics model 614 generates display data of the direction identifier 302 (FIG. 3) upon receiving the direction label data indicating the direction of the supporting character 116 with respect to the reference object. In the example, the graphics model 614 generates display data of the volume level indicator 308 upon receiving the classified audio data indicating an intensity, such as an amplitude, of sound uttered by the supporting character 116.

As another example, the graphics model 614 generates display data of the border 414 (FIG. 4) upon receiving the source label data identify that the source of sound is the virtual bullets shot from the virtual gun 120. As yet another example, the graphics model 614 generates display data of the border 502 (FIG. 5) upon receiving the source label data identifying that the source of a sound uttered in the scene 504 is of the large monster 118, and receiving the classified audio data indicating that the sound is of the low amplitude and of the low frequency. In the example, the graphics model 614 receives game data, such as display data of the health level indicator 506 (FIG. 5) from the one or more processors of the computing device system to determine to generate the border 502 around the health level indicator 506. As yet another example, the graphics model 614 generates display data of a thick border around the large monster 118 upon receiving the source label data identifying that the source of a sound uttered with a display of the scene 504 (FIG. 5) is of the large monster 118, and receiving the classified audio data indicating that the sound is of the high amplitude and of the high frequency. As another example, the graphics model 614 generates display data highlighting different portions of a border surrounding the main character 114 to convey different information. In the example, the graphics model highlights a left portion of the border to be red to indicate that the large monster 118 is to the left of the main character 114 and a right portion of the border to be blue to indicate that the supporting character 116 is to the right of the main character 114.

As yet another example, the graphics model 614 generates display data to display nested borders having an inner border and an outer border. The inner border provides information regarding the large monster 118, such as how far or close the large monster 118 is compared to the main character 114 or whether the large monster 118 is about to die or about to rejuvenate, and the outer border provides information regarding the supporting character 114, such as how far or close is the supporting character 114 compared to the main character 114 or whether the supporting character 114 is about to die or about to rejuvenate. Examples of the graphical output 602 include the information associated with the scene 104, or the scene 402, or the scene 504. The display data of the graphical output 602 generated by the graphics model 614 is stored by the graphics model 614 in the one or more memory devices of the computing device system.

The graphics model 614 determines locations, with respect to the scene, at which the graphical output 602 is to be displayed. For example, the graphics model 614 determines that the source indicator 122 is to be displayed within the display area 122 (FIG. 1) below the scene 104. Moreover, in the example, the graphics model 614 determines that the source indicator 122 is to be displayed next to, e.g., to the left of, the words, "Monster behind you?". As another example, the graphics model 614 determines that the emotion identifiers 204 through 210 are to be displayed within the display area 202 (FIG. 2) below the scene 104. As yet another example, the graphics model 614 determines that the direction identifiers 302 through 306 are to be displayed within the display area 308 (FIG. 3) below the scene 104 and to the left of the volume level indicators 308 through 312. As still another example, the graphics model 614 determines that the volume level indicators 308 through 312 are to be displayed within the display area 308 (FIG. 3) below the scene 104 and to the right of the direction identifiers 302 through 306. Examples of the locations of the graphical output 602 includes positions and orientations of the graphical output 602.

In an operation 650, it is determined whether the volumes of sounds output with a scene, such as the scene 104 or 402 or 504, are less than the predetermined threshold or that the profile 1 indicates that the user 1 is hearing impaired or a combination thereof. Upon determining in the operation 650, that the volumes of sounds output with a scene, such as the scene 104 or 402 or 504 is less than the predetermined threshold or that the profile 1 indicates that the user 1 is hearing impaired or both that the volumes are less than the predetermined threshold and the user 1 is hearing impaired, the processor of the computing device system accesses, such as reads, the graphical output 602 generated based on the scene from the one or more memory devices of the computing device system. In an operation 652, upon accessing the graphical output 602, the processor of the computing device system provides the graphical output 602 to the display device 108 for display of the graphical output 602 with the scene 104. For example, the processor of the computing device system sends an instruction to a processor of the display device 108 to display the source indicator 122 and the emotion identifiers 206 through 210 within a predetermined amount of time after utterance of the words, "Monster behind you!" by the supporting character 116 (FIG. 1). In the example, the predetermined amount of time is a time before a display of the scene 402 (FIG. 4). In the example, the scene 402 is displayed consecutive to the scene 104.

On the other hand, upon determining, in the operation 650, that the volumes of sound output with the scene is not less than the predetermined threshold and that the profile indicates that the user 1 is not hearing impaired, in an operation 654, the processor of the computing device system does not access the graphical output 602 from the one or more memory devices of the computing device system and does not provide the graphical output 602 for display on the display device 108.

In one embodiment, the graphics model 614 determines that that a scene (not shown) similar to one or more of the scenes 104, 402, and 504 is being displayed on a display device, such as the display device 108 or another display device operated by the user 1 or a user other than the user 1. For example, the graphics model 614 determines whether the scene (not shown) has similar characters or similar virtual objects or a similar virtual background or similar sounds or a combination thereof as that of the scene 104. To illustrate, the graphics model 614 determines whether the scene (not shown) has the same characters, or the same objects, such as virtual objects, or the same sounds or a combination thereof as that of the scene 104. In the example, upon determining so, the graphics model 614 determines to apply the graphical output 602 determined from the scene 104 to the scene (not shown). To illustrate, the graphical model 614 overlays the display data generated by the graphical model 614 based on the scene 104. In the illustration, the display data is overlaid on the scene (not shown). On the other hand, upon determining that the scene (not shown) is not similar to the scene 104, the graphics model 614 determines not to apply the graphical output 602 generated based on the scene 104 to the scene (not shown).

Figure 7A:
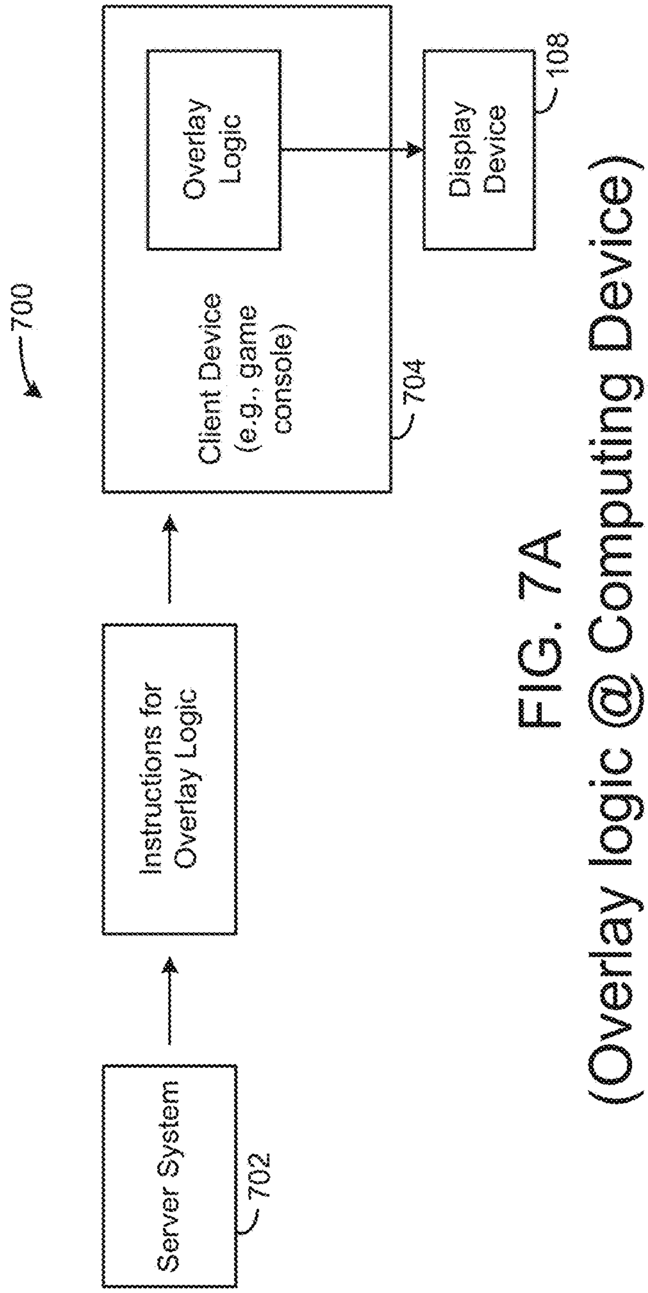
FIG. 7A is a diagram of an embodiment of a system to illustrate instructions for overlay logic that is stored on a client device.

FIG. 7A is a diagram of an embodiment of a system 700 to illustrate instructions for overlay logic that is stored on a client device, such as the computer or the game console or the television or the smart television or the smartphone. The system 700 includes a server system 702, a client device 704, and the display device 108. The server system 702 is an example of the computing device system. The server system 702 includes one or more servers that are coupled to the client device 704 via a computer network, such as the Internet or an Intranet or a combination thereof. The client device 704 is coupled to the display device 108.

The client device 704 includes the overlay logic. For example, the overlay logic includes a rendering operation stored in a memory device of the client device 704. In the example, the graphical output 602 generated based on a scene is overlaid on the scene when the overlay logic is executed.

The one or more processors of the server system 702 generate the graphical output 602 and the instructions for display of the graphical output 602 (FIG. 6), and sends the instructions with the graphical output 602 to the overlay logic for overlaying the graphical output 602 on a scene, such as the scene 104 (FIG. 1), or 402 (FIG. 4), or 504 (FIG. 5), based on which the graphical output 602 is generated. As an example, the instructions for displaying the graphical output 602 include the locations, such as positions and orientations, of display of the display data of the graphical output 602 with respect to the scene. The server system 702 sends the instructions via the computer network to the overlay logic on the client device 704.

Upon receiving the instructions, a processor, such as a central processing unit (CPU), or a combination thereof, of the client device 704 executes the overlay logic to control the display device 108 for overlaying the graphical output 602 on the scene at the locations received within the instructions. For example, the processor of the client device 704 instructs a graphical processing unit (GPU) of the display device 108 to render the graphical output 602 to generate images from the display data of the graphical output 602 at the locations received within the instructions. To illustrate, the images representing the graphical output are rendered by the GPU of the display device 108 as overlay on images of the scene 104, or 402, or 504 at the locations received within the instructions.

In an embodiment, the display device 108 is integrated within the client device 704. For example, the display device 108 is a part of the client device 704.

Figure 7B:
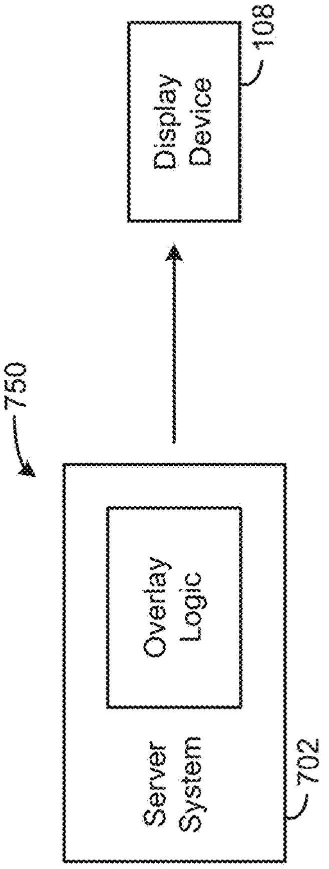
FIG. 7B is a diagram of an embodiment of a system to illustrate that the overlay logic is stored on a server system instead of the client device.

FIG. 7B is a diagram of an embodiment of a system 750 to illustrate that the overlay logic is stored on the server system 702 instead of the client device 704. The system 750 includes the server system 702 and the display device 108. The server system 702 includes the overlay logic. For example, the overlay logic is stored in a memory device of the server system 702.

The one or more processors of the server system 702 execute the overlay logic to generate image frames from the display data of the graphical output 602. For example, the one or more processors of the server system 702 receive a first set of image frames of the scene, such as the scene 104 (FIG. 1), or 402 (FIG. 4), or 504 (FIG. 5), from remaining of the one or more processors of the server system 702 or from another server system, generate a second set of image frames from the display data of the graphical output 602 based on the scene, and overlay the second set on the first set to output a third set of image frames.

The image frames, such as the third set of image frames, include the display data of the graphical output 602 overlaid at one or more locations with respect to the scene. Moreover, the image frames, such as the third set of image frames, include graphical parameters, such as colors and intensities, assigned to the display data by the one or more processors of the server system 702. The image frames, such as the third set of image frames, are encoded by the one or more processors of the server system 702 to output encoded image frames and the encoded image frames are sent from the server system 702 via the computer network to the display device 108. The display device 108 decodes the encoded image frames to output unencoded image frames and displays the unencoded image frames on the display screen of the display device 108 to overlay the graphical output 602 on images of a scene based on which the graphical output 602 is generated.

In an embodiment, in which the audio-only programming is used, instead of the image frames of the scene, audio frames of the scene are used by the one or more processors of the computing device system and instead of overlaying the images of the display data of the graphical output 602 on the image frames of the scene, the images of the display data of the graphical output 602 are displayed synchronous with the output of the audio frames of the scene. For example, the one or more processors of the computing device system synchronize output of the display data of the graphical output 602 generated based on the scene with the audio frames of the scene. To illustrate, the source indicator 102 is displayed on the display device 108 immediately after an audio output of the words, "Monster behind you!" by the one or more speakers of the display device 108 (FIG. 1) or one or more speakers of another client device. In the example, the audio frames are received by the one or more processors of the computing device system from remaining ones of the one or more processors of the computing device system or from another server system.

Figure 8:
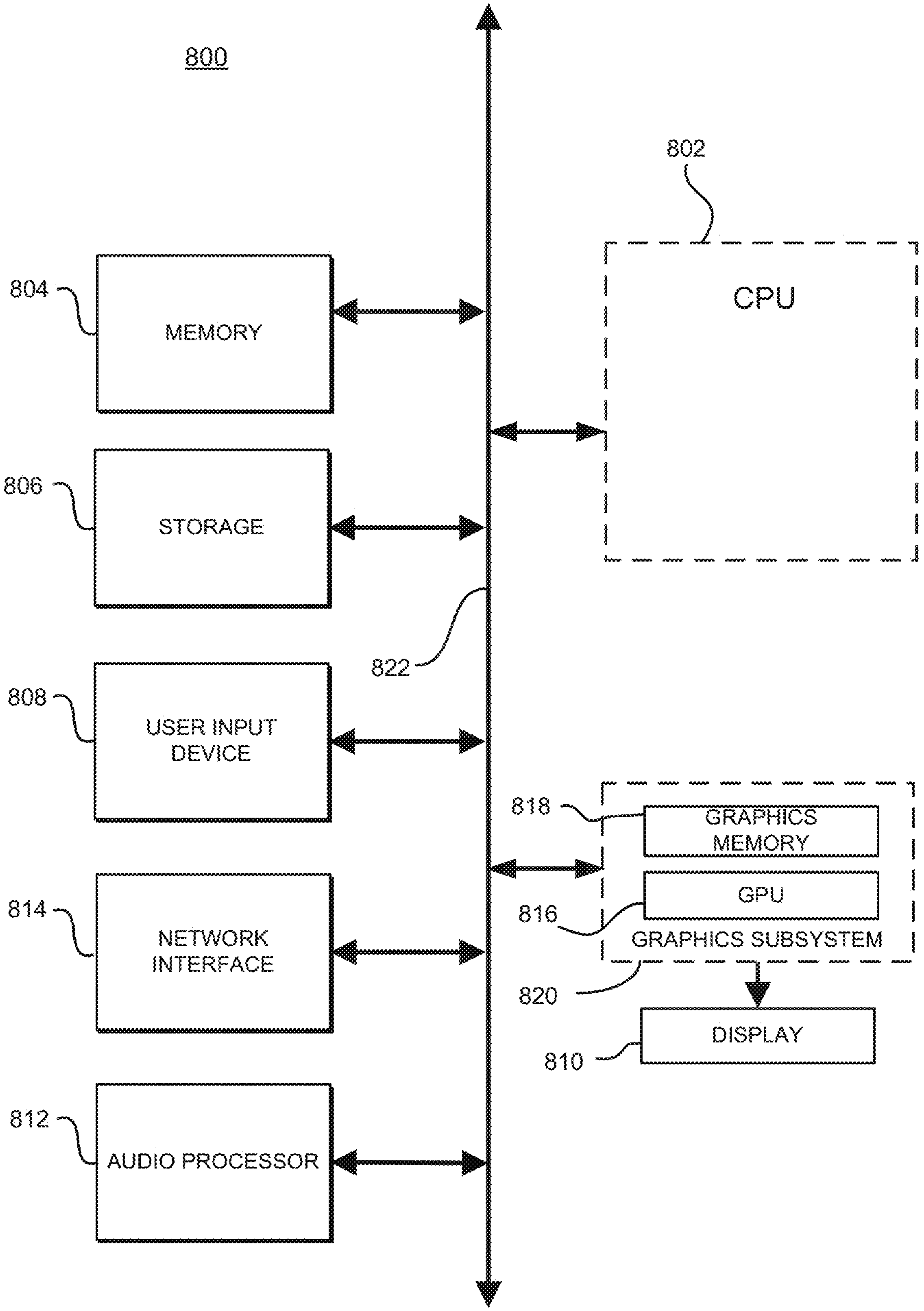
FIG. 8 illustrates components of an example device that can be used to perform aspects of the various embodiments of the present disclosure.

FIG. 8 illustrates components of an example device 800 that can be used to perform aspects of the various embodiments of the present disclosure. This block diagram illustrates the device 800 that can incorporate or can be a personal computer, video game console, personal digital assistant, a server or other digital device, suitable for practicing an embodiment of the disclosure. The device 800 includes a CPU 802 for running software applications and optionally an operating system. The CPU 802 includes one or more homogeneous or heterogeneous processing cores. For example, the CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 800 can be a localized to a player playing a game segment (e.g., game console), or remote from the player (e.g., back-end server processor), or one of many servers using virtualization in a game cloud system for remote streaming of gameplay to clients.

A memory 804 stores applications and data for use by the CPU 802. A storage 806 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 808 communicate user inputs from one or more users to the device 800. Examples of the user input devices 808 include keyboards, mouse, joysticks, touch pads, touch screens, still or video recorders/cameras, tracking devices for recognizing gestures, and/or microphones. A network interface 814 allows the device 800 to communicate with other computer systems via an electronic communications network, and may include wired or wireless communication over local area networks and wide area networks, such as the internet. An audio processor 812 is adapted to generate analog or digital audio output from instructions and/or data provided by the CPU 802, the memory 804, and/or data storage 806. The components of device 800, including the CPU 802, the memory 804, the data storage 806, the user input devices 808, the network interface 810, and an audio processor 812 are connected via a data bus 822.

A graphics subsystem 820 is further connected with the data bus 822 and the components of the device 800. The graphics subsystem 820 includes a graphics processing unit (GPU) 816 and a graphics memory 818. The graphics memory 818 includes a display memory (e.g., a frame buffer) used for storing pixel data for each pixel of an output image. The graphics memory 818 can be integrated in the same device as the GPU 816, connected as a separate device with the GPU 816, and/or implemented within the memory 804. Pixel data can be provided to the graphics memory 818 directly from the CPU 802. Alternatively, the CPU 802 provides the GPU 816 with data and/or instructions defining the desired output images, from which the GPU 816 generates the pixel data of one or more output images. The data and/or instructions defining the desired output images can be stored in the memory 804 and/or the graphics memory 818. In an embodiment, the GPU 816 includes three-dimensional (3D) rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from the graphics memory 818 to be displayed on the display device 810. The display device 810 can be any device capable of displaying visual information in response to a signal from the device 800, including a cathode ray tube (CRT) display, a liquid crystal display (LCD), a plasma display, and an organic light emitting diode (OLED) display. The device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term “virtual reality” (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user’s eyes. Thus, the HMD can provide display regions to each of the user’s eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user’s interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for communicating audio data, comprising:

generating a set of identifiers for an audio source in a scene of a video game to identify an emotion output from the audio source and a direction of the audio source, wherein the direction is identified relative to a location of a virtual object being controlled in the scene by a user;

sending data to a client device to generate a display region in the scene of the video game, wherein the display region includes the set of identifiers that graphically indicate the emotion output from the audio source and the direction of the audio source relative to the virtual object; and presenting a first border with the scene, wherein the first border indicates at least the direction of the audio source included in a plurality of audio sources, and wherein a visual property for presenting the first border is based on at least the emotion.

2. The method of claim 1, wherein the virtual object includes one or more video game characters.

3. The method of claim 1, further comprising:

accessing at least one indicator of at least one amplitude of at least one of a plurality of sounds to be output with the scene; and sending the at least one indicator of the at least one amplitude to display the at least one indicator of the at least one amplitude with the output of the scene.

4. The method of claim 1, further comprising:

generating a second border, different from the first border, based on at least one of a plurality of sounds to be output with the scene; and displaying the second border with the output of the scene.

5. The method of claim 1, wherein the first border further indicates at least one of: an emotion of the audio source, an identity of the audio source, or a volume of the audio source.

6. The method of claim 1, wherein the scene is to be displayed with output of a plurality of sounds, wherein the plurality of sounds include a sound of a character, a sound of music, an ambient sound, and a sudden sound.

7. The method of claim 1, further comprising:

generating a plurality of image frames having the set of identifiers, wherein said sending the data includes sending the plurality of image frames via a computer network to the client device for display of the plurality of image frames.

8. The method of claim 1, wherein said sending the data includes sending the set of identifiers is via a computer network to the client device, wherein the client device is configured to generate a plurality of images having the set of identifiers for display of the plurality of images on a display device of the client device.

9. The method of claim 1, further comprising:
determining whether a plurality of volumes of a plurality of sounds are below a pre-determined threshold; and
accessing the set of identifiers upon determining that the plurality of volumes are below the pre-determined threshold.

10. The method of claim 1, wherein the visual property comprises at least one of a color of the first border, a thickness of the first border, a pattern of the first border, or a dynamic animation of the first border.

11. A server for communicating audio data, comprising:
a memory storing first instructions; and
a processor configured to execute the instructions to cause the server to:
generate a set of identifiers for an audio source in a scene of a video game to identify an emotion output from the audio source and a direction of the audio source, wherein the direction is identified relative to a location of a virtual object being controlled in the scene by a user;
send data to a client device to generate a display region in the scene of the video game, wherein the display region includes the set of identifiers that graphically indicate the emotion output from the audio source and the direction of the audio source relative to the virtual object; and
present a first border with the scene, wherein the first border indicates at least the direction of the audio source included in a plurality of audio sources, and wherein a visual property for presenting the first border is based on at least the emotion.

12. The server of claim 11, wherein the processor is configured to:
determine that a plurality of volumes of a plurality of sounds are below a pre-determined threshold; and
access one of the set of identifiers based on at least the direction of the audio source upon determining that the plurality of volumes are below the pre-determined threshold.

13. The server of claim 11, wherein the processor is configured to:
determine that a plurality of volumes of a plurality of sounds are below a pre-determined threshold;
access at least one indicator at least one amplitude of the at least one of the plurality of sounds upon determining that the plurality of volumes are below the pre-determined threshold; and
send the at least one indicator of the at least one amplitude to display the at least one indicator of the at least one amplitude with an output of the scene.

14. The server of claim 11, wherein the processor is configured to:
determine that a plurality of volumes of a plurality of sounds are below a pre-determined threshold;
generate display data for displaying at least one border based on at least one of the plurality of sounds upon determining that the plurality of volumes are below the pre-determined threshold; and
send the display data to display the at least one border with an output of the scene.

15. The server of claim 11, wherein at least one of a thickness of the first border, a color of the first border, or a pattern of the first border indicates the direction.

16. The server of claim 11, wherein the scene is to be displayed with output of a plurality of sounds, wherein the plurality of sounds include a sound of a character, a sound of music, an ambient sound, and a sudden sound.

17. The server of claim 11, wherein the processor is configured to generate a plurality of image frames having the set of identifiers, wherein to send the data, the processor is configured to send the plurality of image frames via a computer network to the client device for display of the plurality of image frames.

18. The server of claim 11, wherein the data is sent via a computer network to the client device, wherein the client device is configured to generate a plurality of images having the set of identifiers for display of the plurality of images on a display device.

19. The server of claim 11, wherein the processor is configured to:
determine that a plurality of volumes of a plurality of sounds are below a pre-determined threshold; and
access the set of identifiers upon determining that the plurality of volumes of the plurality of sounds are below the pre-determined threshold.

20. A client device for communicating audio data, comprising:
one or more storage media storing instructions; and
one or more processors configured to execute the instructions to cause the client device to:
access a set of identifiers for an audio source in a scene of a video game to identify an emotion output from the audio source and a direction of the audio source, wherein the direction is identified relative to a location of a virtual object being controlled in the scene by a user;
provide data to generate a display region in the scene of the video game, wherein the display region includes the set of identifiers that graphically indicate the emotion output from the audio source and the direction of the audio source relative to the virtual object; and
generate a first border for presentation with the scene, wherein the first border indicates at least the direction of the audio source included in a plurality of audio sources, and wherein a visual property for the presentation of the first border is based on at least the emotion.

21. The client device of claim 20, wherein the instructions further cause the one or more processors to cause the client device to:
determine whether a plurality of volumes of a plurality of sounds are below a pre-determined threshold; and
access one of the set of identifiers based at least the direction of the audio source upon determining that the plurality of volumes are below the pre-determined threshold.

22. The client device of claim 20, wherein the instructions further cause the one or more processors to cause the client device to:
determine whether a plurality of volumes of a plurality of sounds are below a pre-determined threshold;
access at least one indicator at least one amplitude of the at least one of the plurality of sounds upon determining that the plurality of volumes are below the pre-determined threshold; and
provide the at least one indicator of the at least one amplitude to display the at least one indicator of the at least one amplitude with an output of the scene.

* * * * *